United States Patent [19]

Larson et al.

[11] Patent Number: 5,381,462
[45] Date of Patent: Jan. 10, 1995

[54] UTILITY MONITOR COMMUNICATIONS SYSTEMS

[75] Inventors: Rodney L. Larson, Minnetonka; Donald L. Meyer, Long Lake, both of Minn.

[73] Assignee: Datran Systems Corporation, Minnetonka, Minn.

[21] Appl. No.: 891,298

[22] Filed: May 29, 1992

[51] Int. Cl.⁶ .......................................... H04M 11/00
[52] U.S. Cl. ..................................... 379/107; 379/106; 379/97
[58] Field of Search ................. 379/107, 106, 97, 102, 379/104, 105, 93

[56] References Cited

U.S. PATENT DOCUMENTS

| | | |
|---|---|---|
| 4,086,434 | 4/1978 | Bocchi . |
| 4,455,453 | 6/1984 | Parasekvakos et al. ............ 379/106 |
| 4,578,536 | 3/1986 | Oliver et al. . |
| 4,639,728 | 1/1987 | Swanson .......................... 379/107 |
| 4,710,919 | 12/1987 | Oliver et al. . |
| 4,720,851 | 1/1988 | Smith . |
| 4,811,389 | 3/1989 | Balch ................................ 379/107 |
| 4,856,054 | 8/1989 | Smith . |
| 4,893,332 | 1/1990 | Brown . |
| 4,902,965 | 2/1990 | Bodrug et al. ..................... 379/107 |
| 5,010,568 | 4/1991 | Merriam et al. . |

Primary Examiner—Curtis Kuntz
Assistant Examiner—Stella L. Woo
Attorney, Agent, or Firm—Schwegman, Lundberg and Woessner

[57] ABSTRACT

A utility meter reading and communications system gathers data from utility meters and sends that data to a utility company's central data collection point (host computer) via phone lines. The system places a call on the user's telephone line at a specified time and date and transmits data using dual-tone multifrequency (DTMF) format. The system ensures that users still may use the telephone line by sensing off-hook conditions initiated by a resident's telephone and immediately dropping the line to reestablish dial tone for the residential customer. The system uses a variety of error-detection procedures and communications protocols to ensure a high degree of reliability in communicating data to and from the central office and the utility meter system. The system also uses communications protocols and handshaking to ensure accurate data communication and allow immediate interruptions of communications should the customer attempt to use the telephone line.

6 Claims, 8 Drawing Sheets

| Figure 2 | Figure 3 |

First Schematic Key

*Fig. 8A*

| Figure 7 | Figure 6 |
| Figure 4 | Figure 5 |

Second Schematic Key

*Fig. 8B*

UTILITY MONITOR COMMUNICATIONS SYSTEMS

FIELD OF THE INVENTION

The present invention relates to utility monitoring apparatus and in particular the present invention relates to utility monitor and communication systems which monitor utility usage and transmit the utility usage information to the utility via phone lines.

BACKGROUND OF THE INVENTION

Utility companies use utility usage meters to determine the amount of utilities consumed at a customer site. A periodic reading of the utility meter is necessary to determine the usage and to bill the customer for the amount used. The need to send utility company employees to customer site to read the meters is a costly and time consuming method of collecting such information. Thus, automated means of recording and reporting the utility usage at customer sites is rapidly replacing the manually-read utility meters.

An example of a utility reporting system is described in the U.S. Pat. No. 4,086,434 to Bocchi entitled "Remote Condition Reporting System." This prior art system records information on utility usage and periodically dials into a central office to report the utility usage for recording and billing purposes. The types of utilities described for this reporting system are water, power, gas and the like. This prior art system connects to the consumer's home telephone line to communicate to the central office using a tone generator to send information over the telephone lines.

This and other prior art systems have several fundamental shortcomings. When communicating on-line with the central office, the telephone subscriber cannot use the residential phone for dialing out. Although the prior art communication systems attempt their telephone connections in the middle of the night, this is a serious shortcoming if the need arises to dial an emergency number such as 911. In addition, many of the prior art utility monitors operate using modems to communicate information between 300 and 2,400 baud or more. These modem-driven utility reporting communication systems fail in many rural environments due to noisy lines, interruption by call-waiting signals and the like. In addition, prior art utility reporting communication systems suffer from a variety of data errors in transmitting the information. The prior art is also lacking in providing Timed Off-peak Usage (TOU) power metering in combination with a utility meter reader and communication system.

SUMMARY OF THE INVENTION

These and other shortcomings of the prior art are solved by the present invention. The present invention is a utility meter reading and communications system which gathers data from utility meters and sends that data to a utility company's central data collection point (host computer) via telephone lines. The present invention places a call on the user's telephone line at a specified time and date and transmits data using dual-tone multifrequency (DTMF) format and ASCII encoding onto DTMF. The use of DTMF format allows greater noise immunity on normally noisy telephone lines and immunity from interruption by call-waiting signals and the like. The present invention ensures that users still may use the telephone line by sensing off-hook conditions initiated by a resident's telephone and immediately dropping the line to reestablish dial tone for the residential customer. The present invention uses a variety of error-detection procedures and communications protocol to ensure a high degree of reliability in communicating data to and from the central office and the utility meter system. The present invention also uses communications protocol and handshaking to ensure accurate data communication and allow immediate interruptions of communications should the customer attempt to use the telephone line.

BRIEF DESCRIPTION OF THE DRAWINGS

FIGS. 8A–8B are schematic keys to show how FIGS. 2–7 should be placed for viewing together.

DETAILED DESCRIPTION OF THE PREFERRED EMBODIMENT

In the following detailed description of the preferred embodiment, reference is made to the accompanying drawings which form a part hereof, and in which is shown by way of illustration specific embodiments in which the invention may be practiced. This embodiment is described in sufficient detail to enable those skilled in the art to make and practice the invention, and it is to be understood that other embodiments may be utilized and that structural, electrical or logical changes may be made without departing from the spirit and the scope of the present invention. The following detailed description is, therefore, not to be taken in a limiting sense, and the scope of the present invention is defined only by the appended claims.

Figure 1:
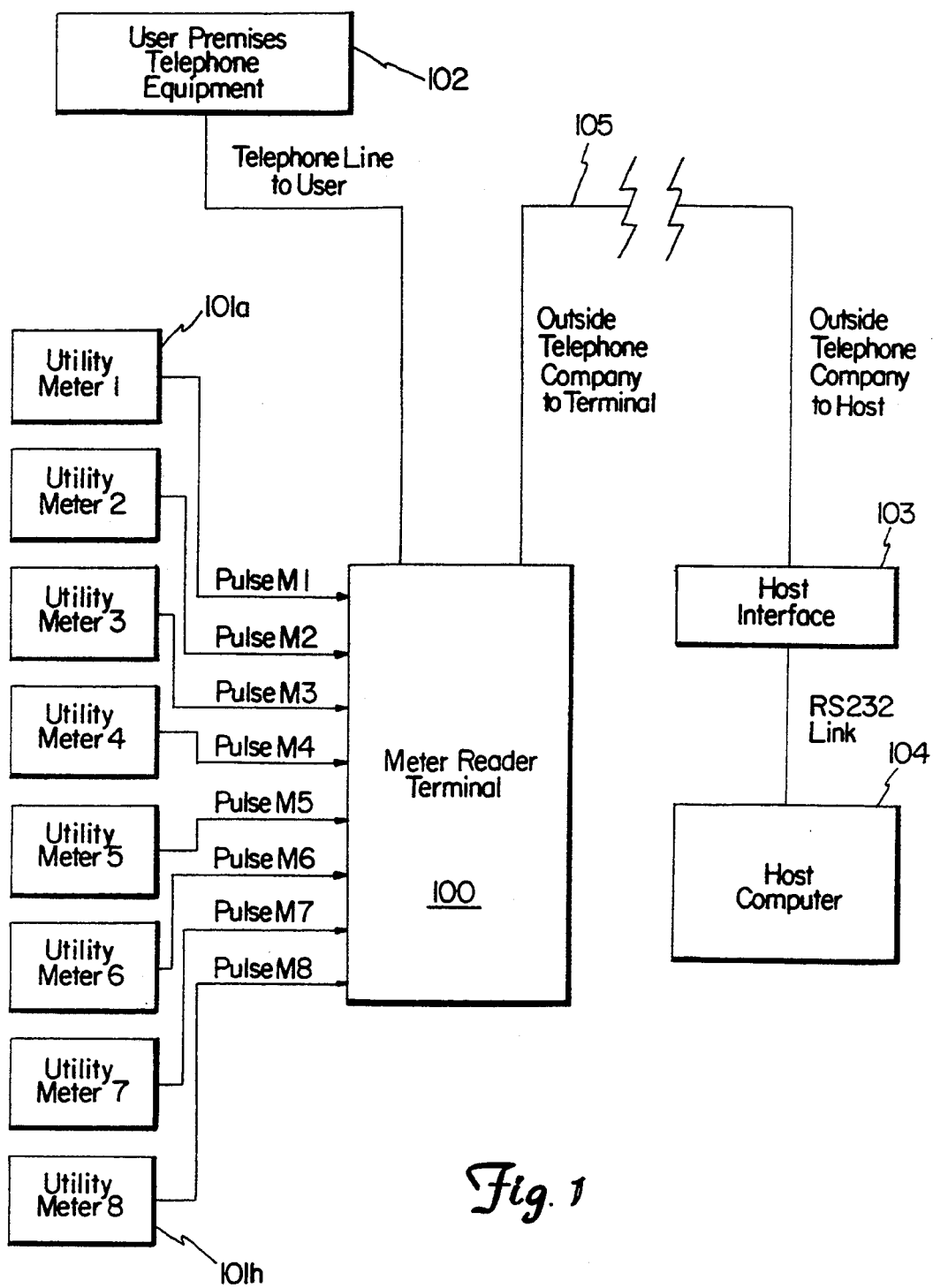
FIG. 1 is a system diagram showing the present invention attached to a utility meter and communicating with a host.

FIG. 1 is a block diagram of the environment in which the present invention is used. The utility meter reader terminal 100 contains the preferred embodiment of the present invention as a means for receiving and recording utility usage and communicating that information to the host computer. The utility meter reader terminal 100 is located at the user/customer premises and is connected on the telephone line between the user premises telephone equipment 102 and the telephone line connection to the telephone company 105. It is essential that the customer's telephone equipment 102 all be located downstream from the present invention so that user-initiated off-hook conditions can be sensed. Meter reader terminal 100 also accepts inputs from a plurality of utility meters exemplified by utility meters 101A through 101H shown in FIG. 1.

The meter reader terminal periodically dials the telephone number of the host computer at a predetermined time and date and downloads information from the utility meters over the telephone line to the host computer. The host computer includes a host interface to the telephone lines which receives the telephone calls from the field installed meter reading terminals. The host computer then compiles the information and prepares utility usage bills which are then sent to the customer to pay for the utilities used.

OPERATION OF THE PRESENT INVENTION

The present invention uses Dual Tone Multi-Frequency (DTMF) dialing tones for communicating to and from the host computer. DTMF dialing tones are preferable to all types of modem communications since they are more immune to distortion and interruption. In many rural environments modem communication rates as low as 300 baud cannot effectively communicate information. The standard noise level on rural communication lines however is still low enough to allow effective DTMF tone transmissions and reception.

The present invention places a call on the user's telephone line at a specified time and date and transmits data using DTMF format and ASCII encoding onto DTMF. In the preferred embodiment of the present invention, the use of the DTMF format allows greater noise immunity on normally noisy telephone lines and immunity from interruption by call-waiting signals. The present invention ensures that users still may use the telephone line by the terminal sensing off-hook conditions initiated by a resident's telephone and immediately dropping the line to reestablish dial tone for the residential customer. The present invention uses a variety of error-detection procedures and communications protocol to ensure a high degree of reliability in communicating data to and from the central office and the utility meter system. The present invention also uses communications protocols and handshaking to ensure accurate data communication and allow immediate interruptions of communications should the customer attempt to use the telephone line.

In the preferred embodiment of the present invention, communicating a burst of information to a central site to the host computer has been measured at approximately 13 seconds for the total phone call. A 1200 baud modem communicating the same amount of information takes about 11 seconds, including all connection and synch times. A 300 baud modem communicating the same information takes 22 seconds, including all connection and synch times. Thus, the present invention does not appreciably add to the communication time that the utility meter reader needs to be on-line for communications yet it appreciably contributes to the noise immunity of its data transmission.

The present invention provides a wide variety of features to the utility company for sensing, recording and transmitting utility usage information. This information can be used to tailor services to their customers and detect potential problems before they occur. For example, in the application of the present invention to electric power utility reading, average kilowatt hours used per day and average power used per hour at specific times of day can be recorded and down-loaded to the utility. Usage averaging can also be fed back to the consumer so that they can review their power usage habits and find cost-saving alternatives to their current habits.

A popular way of reducing peak loads and offering consumers reduced prices on utilities is the concept of timed off-peak usage (TOU). Traditionally, a second kilowatt hour meter is used as a separate AC mains line for distributing and measuring TOU power at a consumer's site. For example, some pumping and power usages in rural environments can be done at any time and so a cost savings is realized by the farmers by doing the majority of their power consumption and usage at night when rates are cheaper via TOU metering. The present invention supports TOU metering by means of an auxiliary input. No additional meter is needed to record the utility usage since the user simply indicates to the present invention that TOU power is being requested and the TOU status is invoked by the present invention.

The present invention is also designed with a nonvolatile memory which is used to control and store usage information for later down-loading to the host computer. An Analog-to-Digital converter is also an integral portion of the present invention which is available to measure line voltage variations for later reporting to the host.

Communications to the host computer is by telephone line connections connected in series with the customer-premises equipment. Two relays and an off-hook detect circuit are included in the present invention to allow a telephone user immediate access to the line if the present invention is currently using the phone line. The present invention automatically disconnects and gives the line back to the user within approximately one second after downstream pick-up of a telephone to ensure that the user gets an immediately dial tone. Also the present invention will not try to connect to the telephone line if the user is already on the line.

The programming of the present invention is designed to use normally quiet nighttime hours for transmitting data to the host computer. For example, the clock/calendar of the present invention will cause an interrupt of the microcontroller at 3:00 a.m. on Monday nights to transmit data either once a week or once a month to the host computer. If the present invention fails to connect to the host computer, the call will be repeated within approximately four minutes and five successive attempts will be tried. If the present invention fails to report within a given period of time, a service person is sent to the customer's residence to repair and maintain the present invention.

In addition to the above-listed features, the present invention is equipped with tamper-detection circuits which will initiate an immediate call to the host computer upon detection of tampering. Moving, tilting or jarring the present invention will cause a motion detector to force an interrupt on the microcontroller which in turn will cause a call to the host. Also, a loop-back circuit is wired through the utility meter such that disconnection of the present invention from the utility meter will cause an immediate call to the host. The present invention is also programmed to detect whether metering pulses have been received within the last hour and within the last day. An insufficient or lack of metering pulses from the meter indicates the disconnection of the present invention from the utility meter which is also invoke a call to the host.

The host computer and communication systems which interface to the present invention are very much like the present invention in the way in which they interface to the telephone lines. A microcomputer or a personal computer is used with peripheral storage systems to record the large volume of calls and data recorded on a daily basis of the utility meter reader devices installed in the field. A personal computer can also be used for recording power usage averages throughout the power grid for detecting and predicting peak loading and potential breakdowns.

DETAILED ELECTRICAL SCHEMATIC DIAGRAMS

Figure 2:
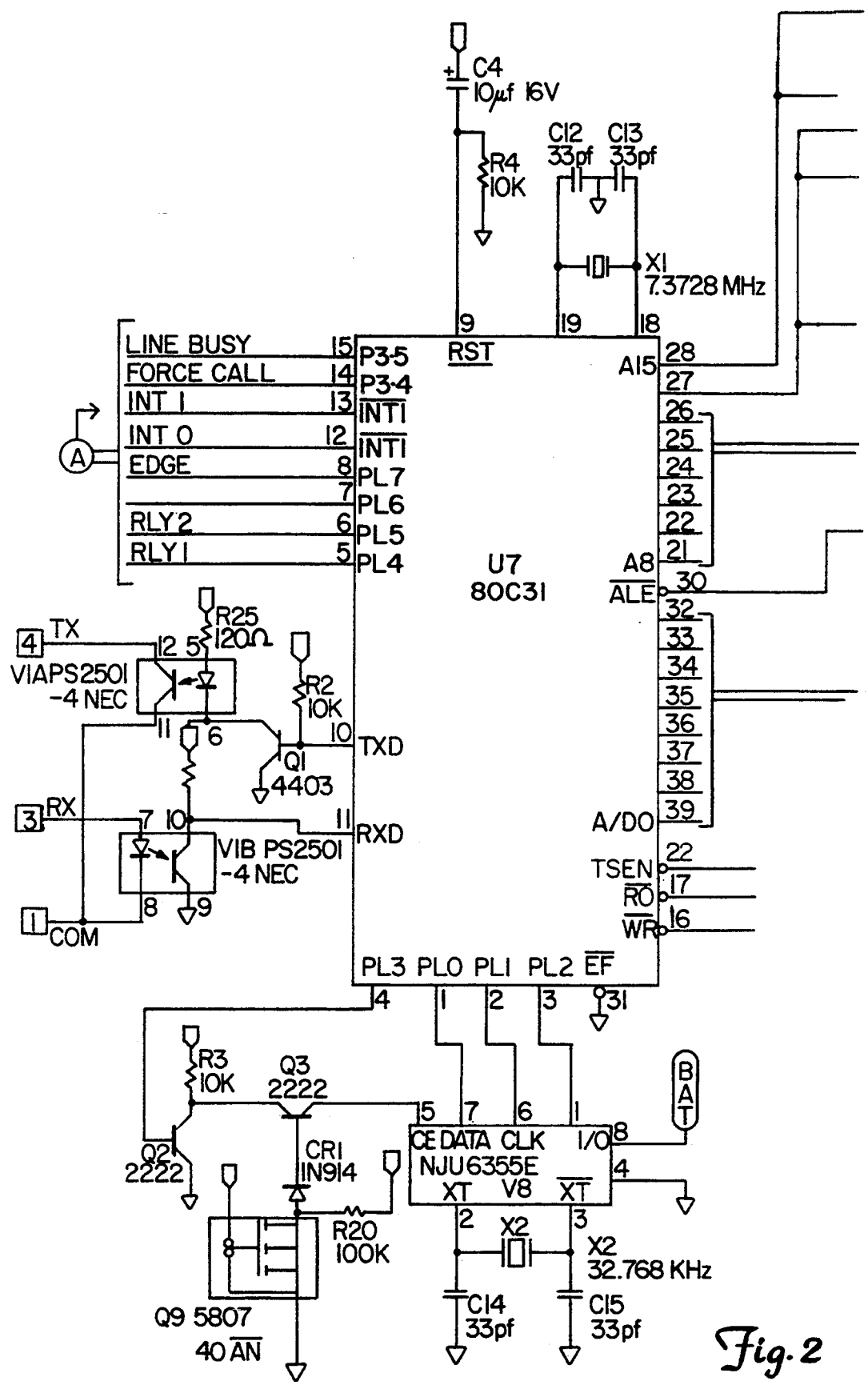
FIGS. 2–7 taken together comprise detailed electrical schematic diagram of the present invention.
Figure 3:
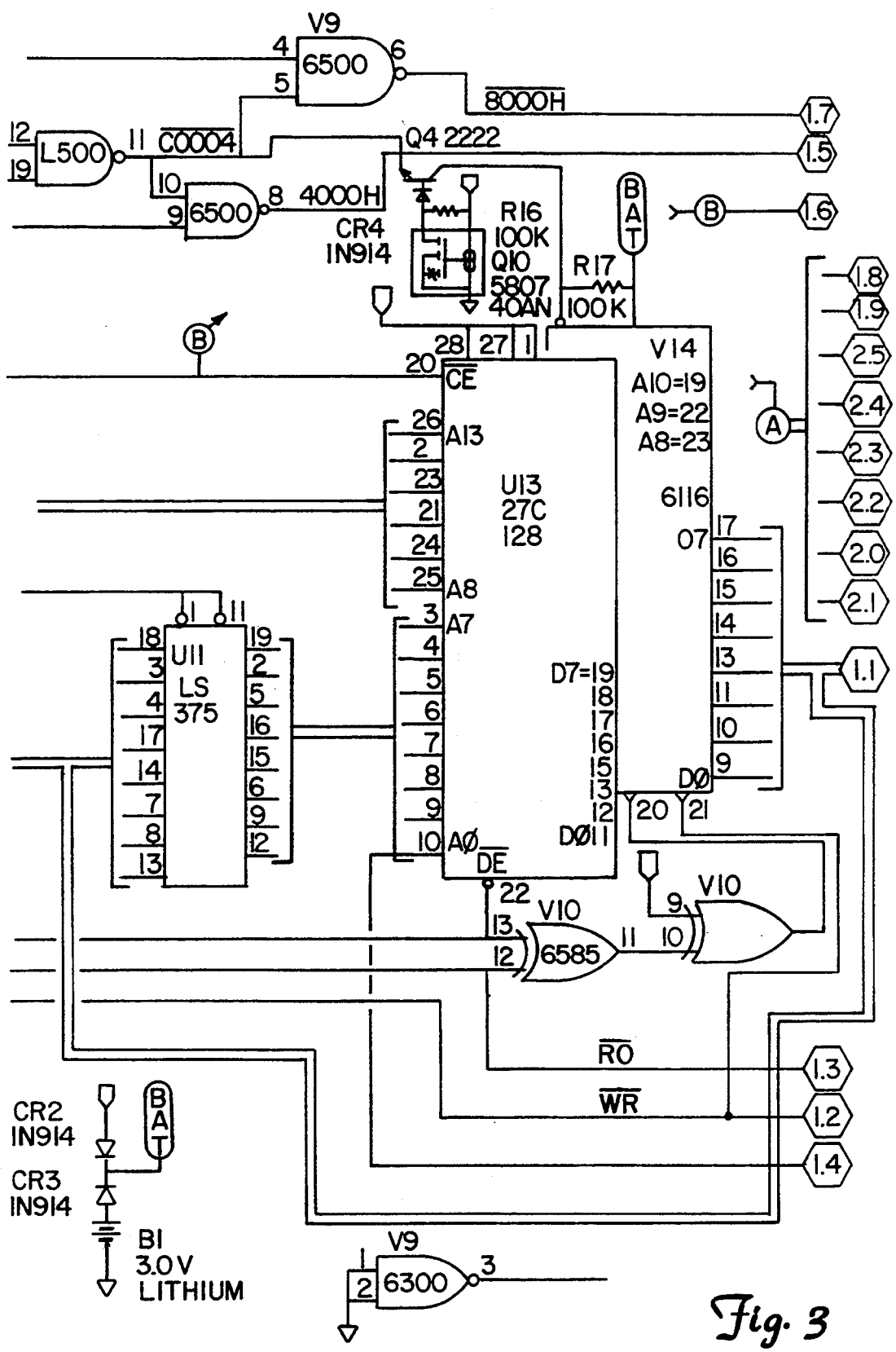

FIGS. 2-7 comprise detailed electrical schematic diagrams which describe the present invention and which should be viewed together. Specifically, FIGS. 2 and 3 are to be view side-by-side (left and right, respectively) to line up the electrical lines passing therebetween, as shown in the schematic key of FIG. 8A. FIGS. 4–7 are to be viewed together to form the second schematic diagram to line up the electrical lines passing therebetween, and are to be placed in counterclockwise positions starting with FIG. 3 in the lower left position, as shown in schematic key of FIG. 8B.

The present invention is based on a microprocessor configured in a bus-structured architecture to control the operations and functions of the present invention. FIG. 2 shows a portion of the microprocessor circuitry including microcontroller U7. In the preferred embodiment of the present invention, microcontroller U7 is part number 80C31 which is a single-chip, 8 bit microcomputer with on-chip RAM and I/O available from Intel and other semiconductor manufacturers. This preferred microcontroller includes a 128 bites of RAM, 32 I/O lines and two 16-bit timer/counters internal to the chip. The 32 I/O lines are multiplexed on the chip pins for multiple uses such as address, data, and I/O use. Not all 32 of the I/O lines are used in this preferred embodiment of the present invention. Those skilled in the art will readily recognize that a wide variety of microprocessor or microcontroller implementations could be used to support the present invention other than the Intel 80C31 shown here.

The low-ordered address lines (8 bits) A0–A7 and 8 data lines (D0–D7) are multiplexed on pins 32–39 as a combined address/data bus. This bus originates on FIG. 2 and extends to FIGS. 3, 4, 6, and 7. The high-ordered address bits are multiplexed out of pins 21–28 (A8–A15) with address lines A14 and A15 being used for special dedicated control as described below. The high-ordered address bus originates on FIG. 2 and extends to FIG. 3.

Also attached to microcontroller U7 is a crystal connected to dedicated crystal inputs for crystal-controlled timing of the internal functions of the microcontroller. Transmit TXD and receive RXD lines on microcontroller U7 are used for an RS-232 port which may be used to program the present invention with a hand-held microcomputer or the like on site. The inputs on connector J4 labeled TX and RX are opto-isolated by optical couplers U1A and U1B.

An integral part of the present invention and a necessary component of the circuitry is clock/calendar chip U8. This is a battery backed-up real-time clock chip part number NJU6355 available from New Japan Radio Co. Ltd. of Mountain View, Calif. This chip contains an internal oscillator (with external quartz crystal), counter, shift register, voltage regulator, voltage detector and interface controller for presenting accurate time and date in a serial fashion on data pin 7. This clock/calendar chip U8 is battery backed up and controlled by a separate crystal X2 for accuracy and nonvolatility of the current time and date. The battery for backing up the clock calendar chip and also for ensuring battery back-up of the RAM chip shown in FIG. 3 is also shown in FIG. 3 as a 3.0 volt lithium battery. A low-voltage threshold detector Q9 is used to detect a low voltage condition on the battery B1 and alert the microprocessor to a failing condition.

FIG. 3 shows a portion of the detailed electrical schematic diagram including the random-access memory (RAM) chip U14 and the programmable read-only memory (PROM) U13. RAM chip U14 is in the preferred embodiment a 2K by 8 bit CMOS static RAM chip for low-power, high-speed operation. This chip in the preferred embodiment is part number HY6116A available from Hyundai Semiconductor of Korea having U.S. headquarters in Santa Clara, Calif. This RAM chip is battery backed up with the lithium battery B1 also shown in FIG. 3. An important feature of this particular type of RAM chip is the reduced power consumption in standby mode allowing very low battery drain from lithium battery B1 during power outages. Although the present invention is powered by a 12 volt DC source deriving its power from the AC mains, a loss of power on the AC mains means loss of power to the present invention. The lithium battery ensures that the current status of data recorded in RAM U14 in not lost. Those skilled in the art will readily recognize that a wide variety of nonvolatile memory could be used and substituted for the RAM chip U14 of the present invention.

RAM chip U14 contains all current operating data and information accumulated from the utility meters. In addition, current command modes are stored in RAM U14 in conjunction with the on-chip RAM of microcontroller U7 of FIG. 2. The low-ordered eight bits of multiplex data/address bus are connected for storing and retrieving data from RAM chip U14 on pins 9–17 (pin 12 being chip ground). The address lines on pins 1–8 (not shown) are connected in parallel with the low-ordered address lines of PROM chip U13.

Programmable read-only memory (PROM) chip U13 is used in the preferred embodiment to store the operating programs of the present invention. PROM chip U13 is in the preferred embodiment part number 27C128 available from Intel and other semiconductor vendors. This chip in the preferred embodiment is 128 Kbits arranged as 16K by 8. This is a standard EPROM which is field programmable and erasable using ultraviolet light. Those skilled in the art will readily recognize that a wide variety of PROM chips may be used in the present invention and substituted for the type named without departing from spirit and scope of the present invention.

The combined address and data bus originating from microcontroller U7 on FIG. 2 is demultiplexed onto dedicated address and data lines by octal-transparent latch chip U11. This chip combines eight latches in a single package and provides three state outputs for bus interfacing. This chip is in the preferred embodiment part number 74LS373 available from National Semiconductor and many other vendors as a standard 7400 Series TTL part. The three state outputs of chip U11 allow for disconnecting the address lines connected to RAM chip U14 and PROM chip U13 during the data transfer mode of operation of the combined data/address bus.

The high-ordered address bits of PROM chip U13 are connected in a dedicated fashion to high-ordered address pins 21–26 of microcontroller chip U7 shown in FIG. 2.

Figure 4:
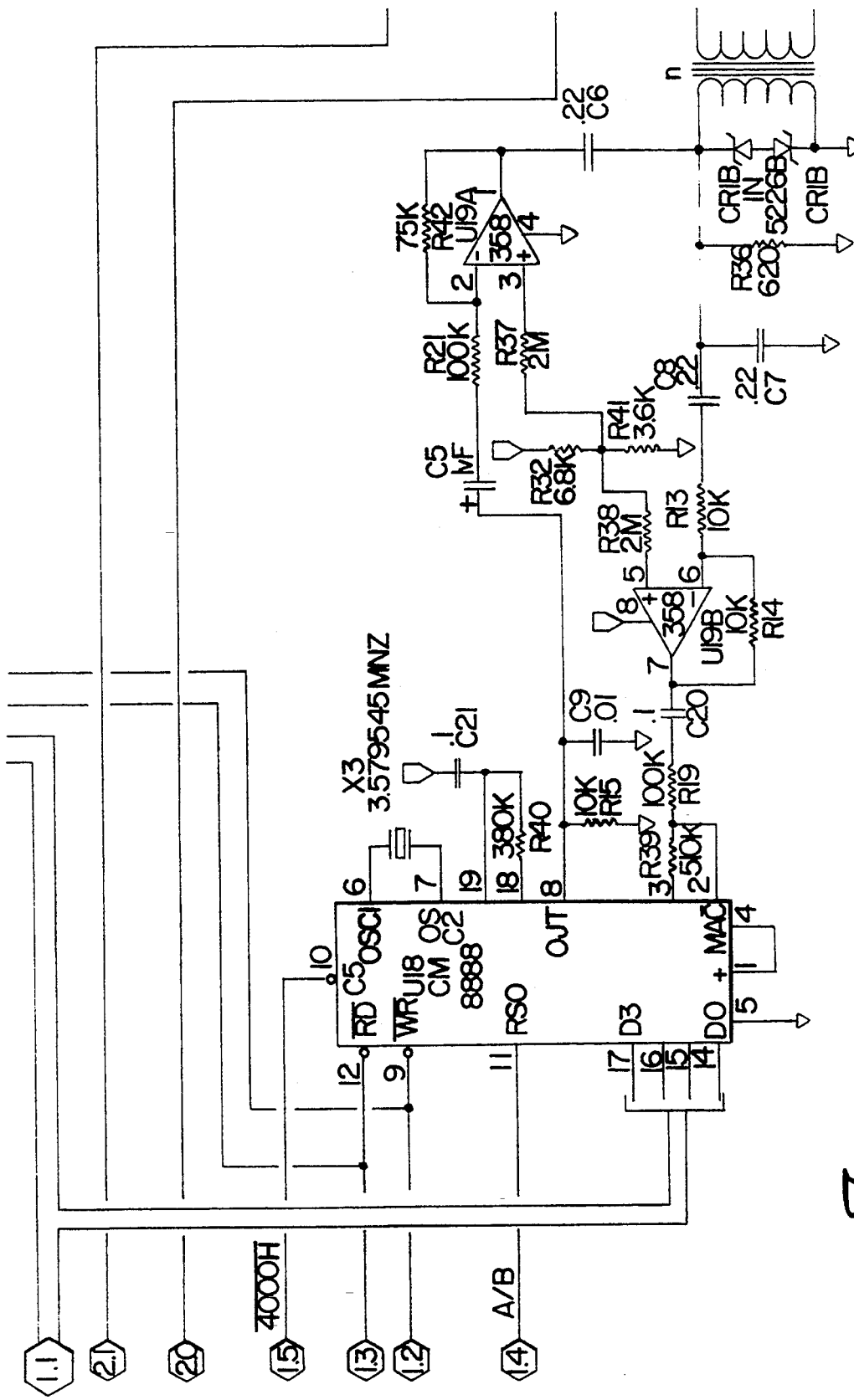

FIG. 4 shows the dual-tone multifrequency (DTMF) transceiver chip U18. This chip in the preferred embodiment of the present invention is part number CM8880/8888 which is a CMOS integrated DTMF transceiver available from California Micro Devices. This DTMF transceiver chip is a complete DTMF transmitter/receiver within a single chip. The timing and frequency control of DTMF transceiver chip U18 is controlled by crystal X3 which is a 3.579545 megahertz crystal selected for its availability (a common NTSC color-burst frequency). Control of DTMF transceiver U18 is from lines 1.5, 1.3 and 1.2 from the microcontroller chip U8 of FIG. 2. The read-write control lines control chip U18 for transmitting data along the combined data and address bus using data bits D0–D3 on pins 14–17 of chip U18.

DTMF transceiver chip U18 communicates by transmitting DTMF tones out pin 8 through a operational amplifier network onto impedance-matching transformer T1. Transformer T1 is connected through the telephone network interface shown on FIG. 5 for transmitting DTMF tones onto the telephone line. In a parallel arrangement, tones received from the telephone line are transmitted through impedance-matching transformer T1 and on through an operational amplifier network to drive the tone inputs to DTMF transceiver chip U18. Operational amplifier U19A of the transmitting network is configured for a gain of approximately 7 while operational amplifier U19B is configured to receive tones with an approximate gain of unity.

Figure 5:
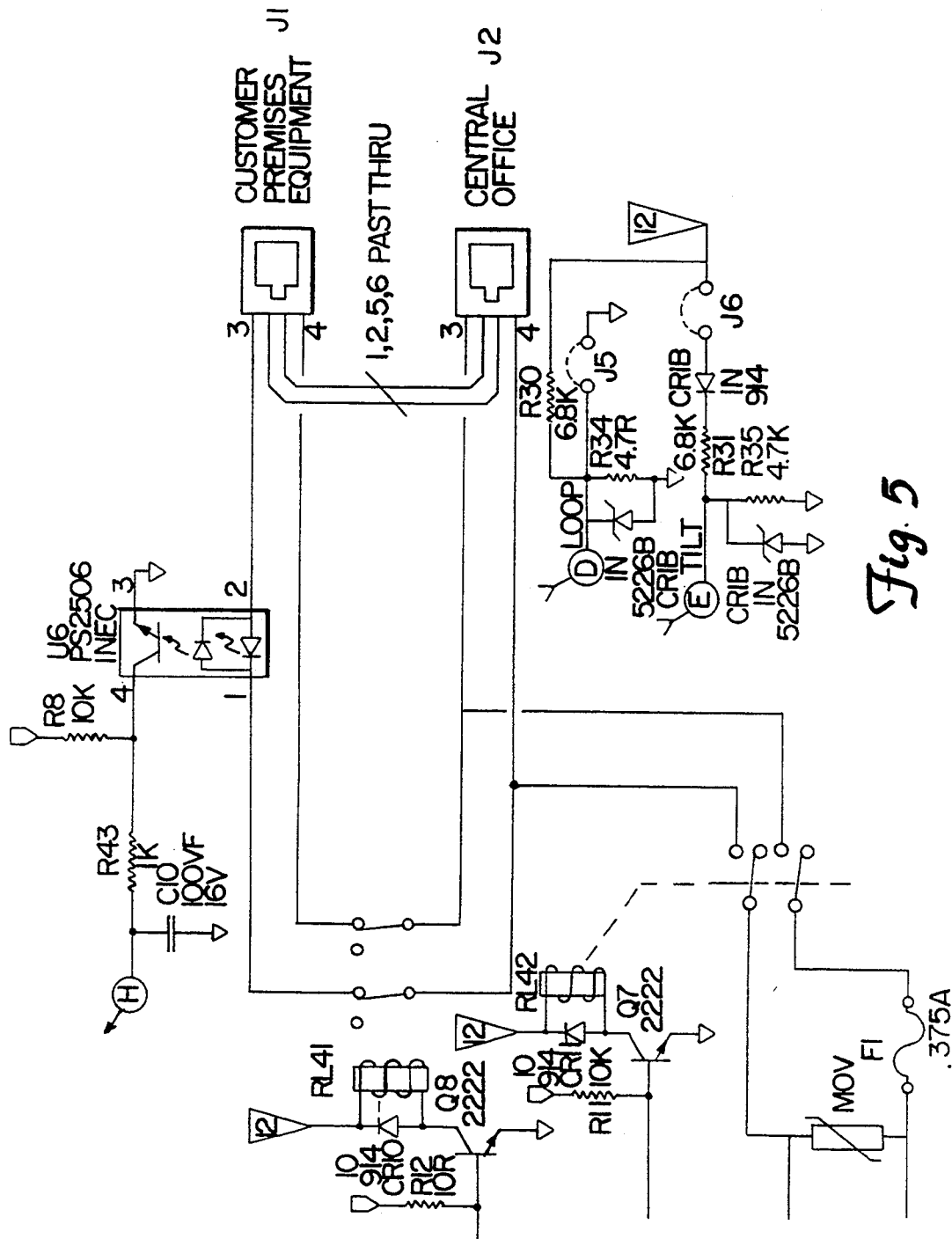

The telephone network interface is shown in FIG. 5. The customer premises telephones must all be passed through the present invention in order for the present invention to detect when an upstream telephone goes off hook. By detecting an off-hook condition on an upstream telephone, the present invention can drop the telephone and relinquish it to the telephone subscriber for use. The time delay in dropping the communication line and restoring dial tone is approximately one second delay. This is hardly noticeable to the customer and allows for transparent operation of the present invention while concurrently allowing the customer to use the telephone at any time of day or night.

Standard RJ-11 connectors are shown in FIG. 5 for connection of the present invention. Only the tip and ring wires 3 and 4 respectively of the RJ-11 jacks are used for communicating. In the Telco standards, pins 3 and 4 correspond to the tip and ring wires of line 1 in that connector. The other wires in the RJ-11 jack are passed through without interruption. It is essential that the customer's telephone equipment all be connected downstream from the present invention so that user-initiated off-hook conditions can be sensed by sensor U6.

Phone relays RLY1 and RLY2 are used to control the seizure of the telephone line and the communication over it. Relays RLY1 and RLY2 are controlled via lines 2.1 and 2.0 from the microcontroller U7 of FIG. 2. Relay RLY1 is normally closed and is used to momentarily open the telephone line to break the terminal-to-host connection and to get a dial tone when detector U6 detects the user's downstream telephone going off-hook. Relay RLY2 is normally open and is used to connect to the telephone line when a terminal-to-host connection is required. When detector U6 detects the user's downstream telephone equipment going off-hook, relay RLY2 is immediately opened drop the terminal-to-host connection. The communications protocol and heavy dependance upon bidirectional handshaking (described more fully below) allows immediate interruption of the terminal-to-host connection without detriment. The reporting communication session of the utility monitor terminal of the present invention can be restarted after the user is finished with the telephone call.

When connected to the telephone, impedance-matching transformer T1 and the electronic circuits connected to it are protected from surges and overvoltage conditions by metal oxide varister MOV and fuse F1. Also, back to back zener diodes on the tone-chip side of impedance-matching transformer T1 are also used to shunt surges (see FIG. 4).

Tamper resistance is also an integral feature of the present invention. Tamper-detection circuits are shown in. FIG. 5 which sense the tilting or movement of the present invention or detect the disconnection or loop-back connections through the meter cables. Either tilting the box or disconnecting the meter cable will cause and interrupt condition on microcontroller U8 which in turn will cause the present invention to alert the central office as to a tampering condition.

Figure 6:
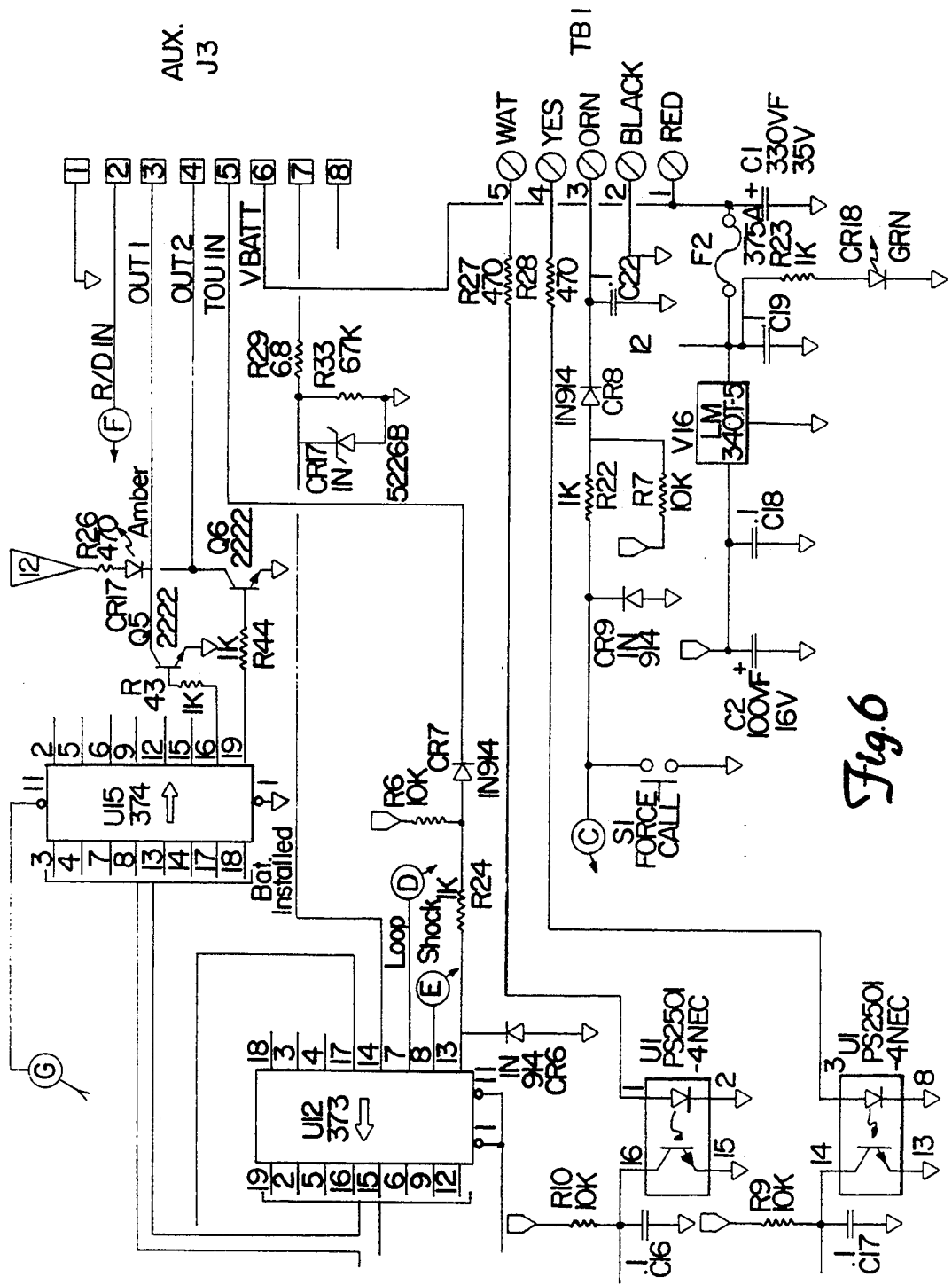

Sensing and control of the metering conditions is shown in FIG. 6. The multiplex data and address bus is shown connected to octal-transparent latch chip U12 which is in the preferred embodiment part number 74373 available from a wide variety of vendors. This standard TTL chip is used to interface sense and control wires to microcontroller U8 of FIG. 2. The combined data and address bus is also connected to chip U15 which is in the preferred embodiment and octal-D-type flip-flop part number 74374 also available from a wide variety of semiconductor vendors. This additional latch chip is also used as an interface to control auxiliary outputs.

Chip U15 receives data from the combined data and address bus when the bus is in the data mode. The only connections interfaced to chip U15 are two auxiliary outputs labeled OUT1 and OUT2. These are external control lines which can be used, for example, for controlling power disconnects or main disconnects. Thus, when the present invention is alert a condition in which the power should be removed (such as nonpayment of utility bills), the present invention can shut off selected circuits, alert the consumer or shut off the mains. An indicator LED CR19 is also shown as an optional means of alerting the user as to a problem condition.

As described above, the present invention can be used in a timed off-peak usage meter. Line TOU IN is used as a user input to request TOU power. This line is interfaced through latch chip U12 which can be read from the combined data and address bus when in data mode. Chip U12 and U13 is also connected through lines D and E to the loop-back sense circuit and tilt-sense circuits respectively.

An optional battery power pack can be installed with the present invention to enable full power operation during loss of AC mains. When an external NiCad battery is used to back up the plus 12 volt supply for the present invention, line 7 of auxiliary connector J3 is tied low to indicate that battery backed-up power is not available. If such power is available, the present invention will operate normally and can continue to communicate with the central office even during loss of mains. Without such battery backup, the present invention can not attempt to communicate with the central office during loss of AC mains power (no power).

Terminal block TB1 is used to connect to the utility meters. In the case of an electrical meter, for example, logic pulses are received from meter 1 on line 5 and logic pulses indicating utility usage for meter 2 are received on line 4. These lines are optically isolated with photocouplers U1A and U1B shown in FIG. 6. The outputs from these opto-isolators are received by microcontroller chip U8 for counting and recording as an indicator of utility usage. Those skilled in the art will readily recognize that a wide variety of utility meters can be interfaced to the present invention for recording utility usage. The logic pulses from an electrical meter, for example, could be received from an optical coupler sensing the rotation of the kilowatt hour disk in a conventional power meter.

Line 3 of terminal block TB1 is used to force a call to the central office at this time. This line could be used by operator maintenance or user requests. Main power is supplied to operate the present invention through pins 1 and 2 of terminal block 1. Pin 2 is system ground and pin 1 receives plus 12 volt DC from an appropriate DC power supply connected to AC mains. The optional battery backup also supplies plus 12 volt DC to pin 1 of terminal block TB1.

The operating voltage for the circuits of the present invention is 5 volts DC. 5 volt DC regulated power is controlled by monolithic regulator chip U16 which in the preferred embodiment is a National part number LM340T-5. 12 volts DC is used in special situations to, for example, control the coils of relays RLY1 and RLY2 shown in FIG. 5.

A key feature of the present invention is the ability to detect if the phone line is in use before seizing the line. As shown in FIG. 5, an opto-isolator chip U6 is placed in series with the tip conductor of the telephone line. Current flow through the tip conductor on the telephone line indicates on off-hook condition upstream from the present invention and that condition is sensed by microcontroller chip U8. In such a condition the present invention will not attempt to seize the line until an on-hook condition is once again restored.

Figure 7:
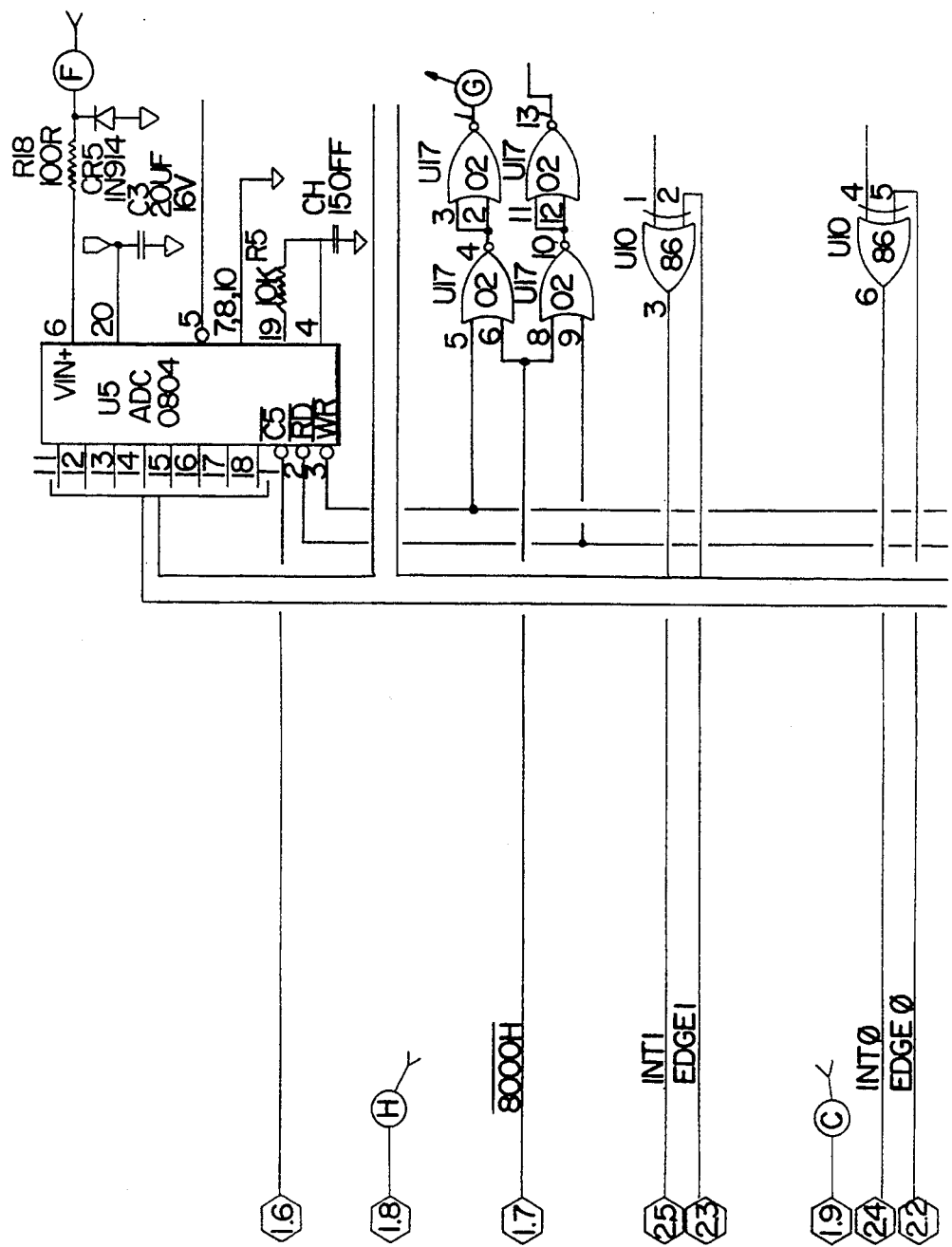

FIG. 7 describes additional control and sense logic used to support additional features of the present invention. Analog to digital (A/D) converter chip U5 is in the preferred embodiment a National part number ADC0804 8 bit A/D converter. An analog input signal is received from pin 2 of an auxiliary connector J3. This analog input is used for sensing the line voltage at the customer premises. The line voltage is sensed with an external circuit which produces a 0–5 volt DC value corresponding to the AC main's voltage. This 0–5 volt DC value is sensed by the $V_{IN}+$ input to A/D converter chip U5 for long-term averaging and sensing of the condition of the AC main's voltage. This type of data gathering of AC main's voltage, power usages and the like at remote customer sites for later down-loading and use by the utility is extremely useful in controlling and predicting utility usage, loading and problems at remote locations. The utility can then use this information for better service to their customers.

Some additional interface logic is shown in FIG. 7. These interface lines make logical decisions of chip read and write signals for assisting in demultiplexing the combined data and address but for chips U12 and U15 shown in FIG. 6.

FIRMWARE

The main software which controls the present invention is stored in PROM chip U13. The main loop of the software is described here.

Main Loop

On Power Up the two auxiliary outputs are turned off. This loop checks for changes to these outputs. The options for these two outputs are stored as 8 bits as follows:

```
1 = Outputs #1 & #2 OFF
2 = Output #2 ON
```

-continued
```
4   = Output #2 Toggles ON/OFF every 2 secs
8   = Output #1 Toggles ON/OFF every Hour
16  = Output #1 ON @Time-of-day
32  = Output #1 OFF @Time-of-day
64  = Output #1 ON Immediately
128 = Output #1 OFF-Immediately
```

If a Time-of-Day option is ON, Read the calendar clock and compare with the output #1 Time-of-Day. If the Hours and Minutes are =, perform the desired output #1 change.

If a toggle function is ON, check if 2 seconds or 1 hour has elapsed. If so, perform output function.

If a valid meter pulse has occurred (Interrupt), then check if rotation pulse time=0, add current pulse time to total, increment number of times saved in total. Repeat for number of active meters.

A meter pulse interrupt also can flag a new minimum rotation pulse time. If so, the current date/time is stored with the new minimum pulse time.

A fail-safe check is done to see if there was a meter pulse in the last hour. If not, a call is made with a transaction code sending this information.

A fail-safe check is also done at midnight to tell if there were any KWH increments during the day. If not, a call with a transaction code is made. Both the Rev/-Hour and KWH Inc/Day are checked for each active meter. These fail-safe conditions could be used, for example, to monitor the heating equipment in a home in the winter to detect failure of power usage due to a tripped breaker.

TOU meter mode is used to swap meter readings. TOU mode can switch meter readings by an external input or Time-of-Day, except for Saturday and Sunday which optionally can force the meter readings on meter 1.

Auto dial is then checked (Month/Day/Hours/Minutes) only if off the phone line.

The Tilt and Loop fail-safes are then checked. This ca be disabled and bypassed. If not, it is checked to see if Tilt or Loop has been interrupted. If yes, a call is made and a transaction code is sent.

Host command tones are checked only when on line. If a command tone is found, then dispatches to command function which will return to loop.

Check if an RS232 command has come in. If so, dispatch to function, then return to loop.

TERMINAL COMMANDS

In following descriptions, Tones flagged w/"H" are sent by the HOST & those flagged w/"T" are sent by the Utility Meter Reader Residential Terminal.

Host to Terminal Commands

All commands are 2 Tones. First Tone # is never [*] or [#]. First tone selects function category:
[0]=NO Commands
[1]=NO Commands
[2]=NO Commands
[3]=NO Commands
[4]=Transmit Data From Terminal
[5]=NO Commands
[6]=DownLoad Data to Terminal
[7]=Reset/Transmit KWH Parameters Commands
[8]=Utility Meter Reader Specific Commands
[9]=Utility Commands
[#],[*]=Tones are never used Utility Meter Reader [0][n]–[3][n] Commands No commands yet implemented. These can be used for future control.

Transmit Data Commands: [4][n]

Send 12 Digit Serial Number: [4][0]

[*] [#] [4] [0] [12 S/N Digits] [#] [CkSum1] [CkSum2] [#]

```
|  |  |   | |                                          |
H  T  └─H─┘ └─────────────T────────────────────────────┘
```

CheckSum is same as ASCII Tone Sequences without counting [#] Terminator Tone. Immediately after the CheckSum, the Terminal sends one more [#] Tone to tell the Host that internal checks are OK.

Send 6 Digit Meter #n KWH Reading: [4][1]

[*] [#] [4][1][n] [6 Meter #n Digits][#][CkSum1][CkSum2]

```
|  |    |    | |                                     |
H  T  └─H─┘ └─────────────T──────────────────────────┘
``` where n=[1]/[2]=Tone for Meter #1/#2
CheckSum is same as ASCII Tone Sequences without counting [#] Terminator Tone.

Send 6 Digit Meter #n Peak Watts & Date/Time: [4][2]

[*] [#] [4][2][n] [6 Meter #n Peak Watt Digits][m][m][d][d]

```
|  |    |    | |                                     |
H  T  └─H─┘ └─────────────T──────────────────────────┘
```

[h][h][m1][m1][#][CkSum1][CkSum2]

```
|                                     |
└─────────────T──────────────────────┘
``` where n=[1]/[2]=Tone for Meter #1/#2
The 6 Digits represent Meter #n Peak Watts (NOT KWatts). The Date/Time represent the date and time of the Peak Watt event.
[m]=Month Digit,
[d]=Day Digit
[h]=Hour Digit,
[m1]=Minute Digit
CheckSum is same as ASCII Tone Sequences without counting [#] Terminator Tone.

Send # of Meters on Unit: [4][3]

[*] [#] [4] [3] [2 # of Meters Digits][#][CkSum1][CkSum2][#]

```
|  |  |   | |                                          |
H  T  └─H─┘ └─────────────T────────────────────────────┘
```

CheckSum is same as ASCII Tone Sequences without counting [#] Terminator Tone.

Send TEST Auto-Dial Month/Day/Hour/Minute: [4][4]

-continued

[*] [#] [4] [4] [m][m][d][d][h][h][m][m][#][CkSum1][CkSum2]

```
|  |  |   | |                                          |
H  T  └─H─┘ └─────────────T────────────────────────────┘
```

CheckSum is same as ASCII Tone Sequences without counting [#] Terminator Tone.
where
[m]=Month Digit,
[d]=Day Digit,
[h]=Hour Digit,
[m]=Minute Digit The Utility Meter Reader Residential Terminal calls the Host on the specified month/day/hour/minute. If there is no successful Host connection, the Utility Meter Reader Residential Terminal will try to call every 255 seconds until successful.

Send Transaction Code (Reason for Call): [4][5]

[*] [#] [4] [5] [t][t][#][CkSum1][CkSum2]

```
|  |  |   | |                                |
H  T  └─H─┘ └─────────────T──────────────────┘
```

CheckSum is same as ASCII Tone Sequences without counting [#] Terminator Tone. tt=transaction code of Table 1.

TABLE 1

Transaction Code Table

| Transaction Code | Reason |
|---|---|
| 00 | Standard Auto-Dial |
| 01 | TEST Auto-Dial |
| 03 | RS232 Command (Handheld) |
| 04 | Manual Switch |
| 07 | Loop Disconnect |
| 08 | TILT (Tamper) Switch |
| 1n | NO REV Pulse/Hour Fail Safe |
|  | n = 1 = Meter 1, |
|  | n = 2 = Meter 2, |
|  | n = 3 = both |
| 2n | NO KWH Increment/Day Fail Safe |
|  | n = 1 = Meter 1, |
|  | n = 2 = Meter 2, |
|  | n = 3 = BOTH |

Send Date/Time/Day-of-Week: [4][6]

[*] [#] [4] [6] [m][m][d][d][y][y][h][h][m1][m1][s][s][dwk]

```
|  |  |   | |                                          |
H  T  └─H─┘ └─────────────T────────────────────────────┘
```

[#][CkSum1][CkSum2]

```
|                                     |
└─────────────T──────────────────────┘
```

CheckSum is same as ASCII Tone Sequences without counting [#] Terminator Tone.
[m]=Month Digit,
[d]=Day Digit,
[y]=Year Digit,
[h]=Hours Digit,
[m1]=Minutes Digit,

[s]=Seconds,
[dwk]=Day-of-Week,
[1]=Sunday,
[7]=Saturday

Send Auto-Dial Month/Day/Hour/Minute: [4][7]

```
[*]  [#]  [4] [7]  [m][m][d][d][h][h][m][m][#][CkSum1][CkSum2]
 |    |    |   |    |
 H    T   L_H_J  L_____T_____J
```

CheckSum is same as ASCII Tone Sequences without counting [#] Terminator Tone.
[m]=Month Digit,
[d]=Day Digit,
[h]=Hour Digit,
[m]=Minute Digit The Utility Meter Reader Residential Terminal calls the Host on the specified month/day/hour. If there is no successful Host connection, the Utility Meter Reader Residential Terminal will try to call every 255 seconds until successful.

When the Utility Meter Reader Residential Terminal wishes to call the Host, the following occurs:

a) Check If User is on Phone Line now. If So, do not connect to phone line. Wait another 255 seconds before trying again.
b) Connect to Phone Line and Check for Dial Tone. If no Dial Tone, disconnect and wait another 255 seconds.
c) Dial Host Telephone Number. After dialing, if there is no Tone response in 25.5 seconds, disconnect and try again in 255 seconds.
d) Interact with Host and disconnect. If at any time during steps b)-d) the User picks up his/her telephone, the Utility Meter Reader Residential Terminal of the present invention will immediately disconnect from the phone line, wait 1 second, then connect the User to the phone line.

Send Host Telephone Number: [4][8]

```
[*]  [#]  [4] [8]  [Host Phone # Digits][#][CkSum1][CkSum2]
 |    |    |   |                                           |
 H    T   L_H_J  L_____T_____J
```

CheckSum is same as ASCII Tone Sequences without counting [#] Terminator Tone.

Send Dialing Speeds/Drop Time/Pulse-Tone Dial: [4][9]

```
[*]  [#]  [4] [9]   [i][i][i][o][o][o][f][f][f][p][p][p][x][x][x]
 |    |    |   |                                                |
 H    T   L_H_J   L_____T_____J

[t][t][t][d][#][CkSum1][CkSum2]
 |                            |
 L_____T_____J
```

CheckSum is same as ASCII Tone Sequences without counting [#] Terminator Tone.

[i] = Pulse Dial Inter-Digit Delay Count
[o] = Pulse Dial ON-HOOK    "      "
[f] = Pulse Dial OFF-HOOK"      "
[p] = Tone Dial Host        "      "
[x] = Tone Data Xmit        "      "
[t] = User Pick-Up Drop Time (.1 Sec increments)
[d] = Pulse/Tone Dial, = [0] = Tone, = [1] = Pulse
[4][#], [4][*] is never used Utility Meter Reader [5][n] Command No commands yet implemented. These can be used for future control.

DownLoad Data Commands: [6][n]

Load/Save 12 Digit Serial Number: [6][0]

```
[*]  [#]  [6] [0] [ASCII Tone Sequence w/ CkSum]
 |    |    |                                   |
 H    T   L_____H_____J GOOD        BAD          CMD         CMD
CHSUM       CHSUM        DONE        ABORT

[#]    or  [*][#][0]    Then  [#]   or   [*][#][1]
 |          |    |             |          |    |
 T         L_T__J              T         L_T__J
```

The Host Sends an ASCII Tone Sequence (with CheckSum) for the Serial Number. The Utility Meter Reader Residential Terminal answers with 2 [#] Tones=Good Load or [*][#][0]=ASCII Tone Sequence CheckSum Error. For a CheckSum Error, the Host must re-send the data or send 1 [#] Tone=ABORT. Not all 12 digits must be sent. The Utility Meter Reader Residential Terminal will add leading zeroes to the Serial Number as needed. If the input is longer than 12 digits, the Utility Meter Reader Residential Terminal truncates the Serial Number at 12 digits. The Terminal ALWAYS answers w/1 more [#] when command done or w/command abort tone sequence.

Load/Save 6 Digit Meter KWH Reading #n: [6][1]

```
[*]  [#]  [6][1][n][ASCII Tone Sequence w/CkSum]  [#][#]
 |    |    |                                    |  |   |
 H    T   L_____H_____J L_T__J
                                                   GOOD
                                                   CKSUM
``` where n=[1]/[2]=Tone for Meter #1/#2

Not all 6 Meter #n Reading KWH digits must be sent. The Utility Meter Reader Residential Terminal will add leading zeroes to Meter Reading #n KWHs as needed. If the input is longer than 6 digits, the Utility Meter Reader Residential Terminal truncates Meter Reading #n KWHs at 6 digits. This Command zeroes the accumulated watts count used for meter number increment.

Load/Save Output Conditions & Time-of-Day: [6][2]

```
-continued
[*] [#]  [6][2][2/3 decimal # Tones][h][h][m][m]   [#]
 |   |    |                                        |   |
 H   T    └────────H────────┘                      T
```

The decimal # is the sum of the Condition Values:
1=Output #1 and Output #2 OFF
2=Output #2 ON
4=Output #2 Toggling ON/OFF every 2 Secs
8=Output #1 Toggling ON/OFF every Hour
16=Output #1 ON @Time-of-Day
32=Output #1 OFF @Time-of-Day
64=Output #1 ON NOW
128=Output #1 OFF NOW
[h]=Hour Digit,
[m]=Minute Digit

Utility Meter Reader [6][3] Commands

This command not used.

Load/Save TEST Auto-Dial Month/Day/Hour/Minute: [6][4]

```
[*] [#]  [6][4][m][m][d][d][h][h][m][m]   [#]   or   [*]
 |   |    |                                |         |
 H   T    └────────H────────┘              T         T
                                           OK        ERROR
```

[m]=Month Digit,
[d]=Day Digit,
[h]=Hour Digit,
[m]=Minute Digit

Utility Meter Reader [6][5] Commands

This command not used.

Load/Save Date/Time/Day-of-Week: [6][6]

```
[*] [#]  [6][6][m][m][d][d][y][y][h][h][m1][m1][s][s][dwk]
 |   |    |                                               |
 H   T    └────────────H─────────────────┘

[#]  or  [*]
 |        |
 T        T
 OK       ERROR
```

[m]=Month Digit,
[d]=Day Digit,
[y]=Year Digit,
[h]=Hours Digit,
[ml]=Minutes Digit,
[s]=Seconds
[dwk]=Day-of-Week,
[1]=Sunday,
[7]=Saturday

Load/Save Auto-Dial Month/Day/Hour/Minute: [6][7]

```
-continued
[*] [#]  [6][7][m][m][d][d][h][h][m][m]   [#]   or   [*]
 |   |    |                                |         |
 H   T    └────────H────────┘              T         T
                                           OK        ERROR
```

[m]=Month Digit,
[d]=Day Digit,
[h]=Hour Digit,
[m]=Minute Digit

Load/Save Host Telephone Number: [6][8]

```
[*] [#]  [6] [8] [ASCII Tone Sequence w/ CkSum]   [#][#]
 |   |    |                                        ||   |
 H   T    └────────────H──────────────┘            └T─┘
                                                  GOOD CKSUM
```

Load/Save Dialing Speeds/Drop Time/Pulse-Tone Dial: [6][9]

```
[*] [#]  [4] [9] [Decimal Tone Sequence]   [#][#]
 |   |    |                                 ||   |
 H   T    └────────────H──────────────┘     └T─┘
                                           GOOD
                                           CKSUM
```

The Decimal tone Sequence contains 2/3 tones for:

| |
|---|
| Pulse Inter-Digit Delay Counter |
| Pulse ON-HOOK Delay Counter |
| Pulse OFF-HOOK Delay Counter |
| Tone Dial Phone # Delay Counter |
| Tone Xmit Data Delay Counter |
| Drop Phone Line Delay (.1 Sec Increments) |
| Pulse/Tone Selection |
| The Host MUST Send 2 or 3 Tones for the Pulse/Tone Dial Selection. Tone Dial MUST be a number >= 128 = [#][2][8], Pulse Dial = 1 = [0][1]. |
| [6][#], [6][*] NEVER USED |

Reset/Transmit KWH Parameters Commands: [7][n]

Utility Meter Reader [7][0] Command

No commands yet implemented. These can be used for future control.

Reset Min. Pulse Time/Rolling Average for Meter #n: [7][1]

```
[*] [#]  [7][1][n]   [#]    n = [1]/[2] = Tone for Meter #1/#2
 |   |    |          |
 H   T    └─H─┘      T
```

Send 6 Digit Meter #n Minimum Pulse Time: [7][2]

-continued
[*] [#] [7][2][n] [6 Meter #n Time Digits] [#] [CkSum1] [CkSum2]

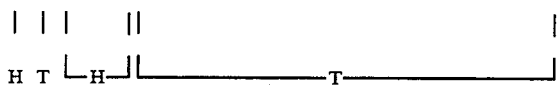

where n=[1]/[2]=Tone for Meter #1/#2

Minimum Pulse Time is in Seconds. CheckSum is same as ASCII Tone Sequences without counting [#] Terminator Tone.

Send Meter #n K Factor: [7][3]

[*] [#] [7][3][n] [3 Meter n K Factor Digits] [#]

where n=[1]/[2]=Tone for Meter #1/#2
K Factor=[0][3][6] or [0][7][2] for 3.6 or 7.2

Send Meter #n Multiplier: [7][4]

[*] [#] [7][4][n] [3 Meter n Mult Digits] [#] [CkSum1] [CkSum2]

where n=[1]/[2]=Tone for Meter #1/#2

Multiplier is represented in Tenths. For example, If the Multiplier=0.5, the 3 digits are [0][0][5]; If the Multiplier=12, the 3 digits are [1][2][0].

Send Meter #n Rolling Average Watts & Date/Time: [7][5]

[*] [#] [7][5][n] [6 Meter #n Avg Watt Digits][m][m][d][d]

[h][h][m1][m1][#][CkSum1][CkSum2]

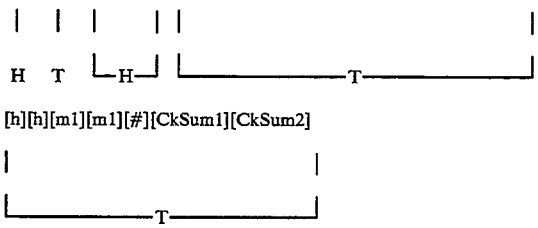

where n=[1]/[2]=Tone for Meter #1/#2

The 6 Digits represent Meter #n Rolling Average Watts (NOT KWatts). The Date/Time represent the date and time of the Peak Watt event.
[m]=Month Digit,
[d]=Day Digit
[h]=Hour Digit,
[ml]=Minute Digit CheckSum is same as ASCII Tone Sequences without counting [#] Terminator Tone.

Load/Save Rolling Average Period (Mins): [7][6]

[*] [#] [7][6][n] [2/3 decimal # Minut Tones] [#]

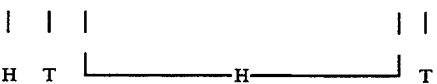

where n=[1]/[2]=Tone for Meter #1/#2

Send Rolling Average Period (Mins): [7][7]

[*] [#] [7][7][n] [3 Roll Avg Mins Digs] [#] [CkSum1] [CkSum2]

Load/Save Loop & TILT Call Disable Flags: [7][8]

[*] [#] [7][8][f1][f2] [#]

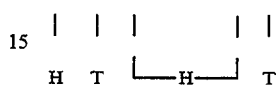

f1=Loop Call Disable
f2=TILT Call Disable, [0]=Ck ON, [1]=Ck Disabled

Utility Meter Reader [7][9] Commands

No commands yet implemented. These can be used for future control. [7][#], [7][*] NEVER USED Utility Meter Reader Specific Commands: [8][n]

Set Auto-Dial for Next Month: [8][0]

[*] [#] [81[0] [#]

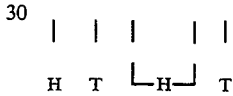

The Utility Meter Reader Residential Terminal increments the Auto-Dial Month and then sends a [#] Tone. If the Month is past December, it rolls to January.

Send EPROM CheckSum: [8][1]

[*] [#] [81[1] [n] [2/3 Dec Tones EPROM CkSum]

The Utility Meter Reader Residential Terminal computes the 3 Byte CheckSum of the EPROM, then sends: [n] Tone=# of Tones to be Sent (not counting this tone) 2/3 Decimal Tones for each byte of 3 Byte CheckSum This Command can be used by the Host for EPROM Version Control (maybe different commands).

DownLoad/Execute RAM Subroutine: [8][2]

[*] [#] [81[2] [2/3 Dec HI Addr] [2/3 Dec LO Addr]

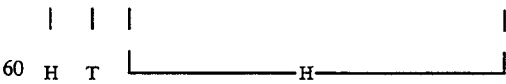

[2/3 Dec CkSum] [#] or [*]

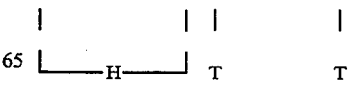

GOOD ERROR

This command requires that the subroutine is linked in one contiguous memory section. Each code line is appended at the end of the previous code line in RAM. Next, each code line is sent:

[2/3 Dec # Line Bytes][2/3 Dec Byte #1] . . . [2/3 Dec Byte #n]

```
|                                                |
|_____H_____|
```

[2/3 Dec CkSum]   [#]      or   [*]

```
|               |  |             |
|_____H_____|  T             T
                 GOOD          ERROR
```

After loading all code lines:   [0][0]   [#]

```
                                |  |  |
                                |__H__|  T
```

The Utility Meter Reader Residential Terminal then executes the subroutine.

Load Meter ON/OFF Flags: [8][3]

[*]   [#]   [81[3][m1][m2]   [#]   where m1 = meter #1 ON/OFF
                                         m2 = Meter #2 ON/OFF
                                         ON = [1]/OFF = [0]
```
|     |     |                   |     |
H     T     |____H____|          T
```

Send Meter ON/OFF Flags: [8][4]

[*]   [#]   [81[4]   [m1][m2][#][CkSum1][CkSum2]

```
|     |     |         |    |                      |
H     T     |_H_|    |_____T_____|
``` where m1 = Meter #1 ON/OFF, m2 = Meter #2 ON/OFF, ON = [1]/OFF = [0]

Load TOU Meter Flags and Switch Times: [8][5]

[*]   [#]   [[81[5][tf][wf][h1][h1][m1][m1][h2][h2][m2][m2]

```
|     |     |                                                 |
H     T     |_____H_____|
```

[*]    or   [#]

```
|           |
T           T
ERROR       OK
``` tf=TOU Mode EXT/ON/OFF=[3]/[1]/[0]
wf=Weekend on Meter #1 ON/OFF=[1]/[0]
h1=Hour Digit for Switch to M1 Time If BOTH M1/M2 Times=0, ALWAYS on M1
m1=Minute Digit for Switch to M1 Time
h2=Hour Digit for Switch to M2 Time
m2=Minute Digit for Switch to M2 Time Send TOU Meter Flags and Switch Times: [8][6]

[*]   [#]   [81[6]

```
|     |     |     |
H     T     |_H_|
```

[tf][wf][h1][h1][m1][m1][h2][h2][m2][m2][#][CkSum1][CkSum2]

```
|                                                              |
|_____T_____|
``` tf=TOU Mode EXT/ON/OFF=[3]/[1]/[0]
wf=Weekend on Meter #1 ON/OFF =[1]/[0]
h1=Hour Digit for Switch to M1 Time
m1=Minute Digit for Switch to M1 Time
h2=Hour Digit for Switch to M2 Time
m2=Minute Digit for Switch to M2 Time Load Fail Safe Flags & Valid Dates: [8][7]

[*]   [#]   [81[7][f1][f2][m1][m1][d1][d1][m2][m2][d2][d2]

```
|     |     |                                                 |
H     T     |_____H_____|
```

[*]    or   [#]

```
|           |
T           T
ERROR       OK
``` f1=NO REV Pulse/Hour, [0]=OFF/[1]=ON
f2=NO KWH Increment/Day, [0]=OFF/[1]=ON m1=Month Digit, Active NO KWH Period
d1=Day Digit, Active NO KWH Period If both Dates=0, Fail Safe always ON
m2=Month Digit, NO KWH Fail Safe OFF
d2=Day Digit, NO KWH Fail Safe OFF Send Fail Safe Flags and Valid Dates: [8][8]

[*]   [#]   [81[8]

```
|     |     |     |
H     T     |_H_|
```

[f1][f2][m1][m1][d1][d1][m2][m2][d2][d2][#][CkSum1][CkSum2]

```
|                                                              |
|_____T_____|
```

Definitions of f1,f2,m1,d1,m2, and d2 are the same as for Command [8][7]

Utility Meter Reader [8][9] Command
This Command NOT Supported
[8][#], [8][*] NEVER USED Utility Commands: [9][n]
Utility Meter Reader [9][0]-[9][8] Commands
No commands yet implemented. These can be used for future control.

Disconnect From Phone Line: [9][9]

```
[*] [#] [9] [9]
 |   |   |   |
 H   T   └─H─┘
```

[9][#], [9][#] NEVER USED

Utility Meter Reader Residential Terminal to Host Commands

[*][1], [*][2], [*][3], [*][4], [*][5], [*][6], [*][7], [*][8], [*][9]UNUSED

Re-Xmit ASCII/Decimal Tone Sequence

[*][#][0]

ABORT ASCII/Decimal Tone Sequence Request

[*][#][1]

COMMUNICATIONS PROTOCOL

The Utility Meter Reader of the preferred embodiment of the present invention (also known as the Terminal) ONLY wants to receive an Attention Tone [*] as a Command Request from the Host. A [*] Tone has another use as an indicator of an ASCII character whose value is >199.

ASCII Tone Sequence

An ASCII Tone Sequence consists of the decimal equivalents of the ASCII characters, followed by 2 [0] tones and a 2 digit decimal checksum as Terminators. Any character with a decimal value greater than 99 uses the [#] Tone for the hundreds digit required. Any character with a decimal value greater than 199 uses the [*] Tone for the hundreds digit required. For example, the character <A> has the decimal value of 65 with a tone equivalent of [6][5], while the character <z> has the decimal value of 122 with a tone equivalent of [#][2][2]. For a character with a value of 255, the tones are [*][5][5]. The 2 digit decimal checksum is the sum of the tone values, with [#] counting as 1 and [#] counting as 2. The checksum calculation ignores any CARRY of the sum to the hundreds digit. For example, the ASCII string of "Az" followed by a Carriage Return would have a tone sequence of:

```
[6] [5] [#][2][2] [1] [3] [0] [0] [2] [0]
 |   |     |       |   |   |   |   |   |
 | A |  z  | CR  |Term |CSum
```

Also, the ASCII Tone Sequence allows more rapid transmission of numeric data by using a special ASCII character to shift tone translation from ASCII conversion to direct tone conversion. This amounts to data compression since the true ASCII characters for the numeric characters need not be sent. If the Sequence contains a <STX>=2 decimal character (STX in the ASCII character set is a "start of transmission" command and is 02 decimal in the ASCII conversion charts), the Utility Meter Reader of the present invention converts all following tones up to a [#] Tone to ASCII numerics. For example, the ASCII may contain the following characters:

... AB 1234C ...

The ASCII Tone Sequence could then contain the following tone sequence:

```
[6] [5] [6] [6] [3] [2] [0] [2] [1] [2] [3] [4] [#] [6] [7]
 |   |   |   |   |   |   |   |   |   |   |   |   |   |   |
 | A | B |Space|<STX>| 1 | 2 | 3 | 4 | X | C
``` where X means EXIT.

The [#] Tone signals a return to normal ASCII decimal decoding. An ASCII Tone Sequence can have several numeric shifts. The number mode terminator [#] counts as a 1 decimal in the Sequence CheckSum.

The Tone Sequence allows transmission of repeated characters in a compact form. The repeat character field starts with an <ETX>=3 decimal. The next 2 or 3 tones are the decimal of the ASCII character to repeat. The last 2 tones are the decimal number of repeated characters. For example, 10 spaces can be sent as:

```
... [0] [3] [3] [2] [1] [0] ...
     |   |   |   |
     |ETX|Space| # |
```

Those skilled in the art will readily recognize that other data compression techniques can be used with the preferred embodiment of the present invention by utilizing the ASCII control characters to initiate and terminate special modes of communication.

Decimal Number Tone Sequence

Some commands want only decimal data. The Decimal # Tone Sequence consists ONLY of 2/3 tones per decimal # with 2 [0] Tone terminators and 2 Tones for the CheckSum. The CheckSum is computed from the Tones EXACTLY like the ASCII Tone Sequence. If the decimal # is >=200, then the 1st Tone=[*]; If the decimal # is >=100, then the 1st Tone=[#]. For example:

| Decimal # | Tones |
|---|---|
| 23 | [2][3] |
| 104 | [#][0][4] |
| 231 | [*][3][1] |

Host to Utility Meter Reader Commands

ALL commands begin with a [*] Tone From the Host to the Utility Meter Reader, the Utility Meter Reader then sends an Acknowledge [#] Tone to the Host. The Host then sends 2 more Tones to specify the Command to execute. The Host then may send any necessary command parameters. The first Tone only dispatches the Command to the specific table (Table 2), where the 2nd Tone selects the exact Command.

TABLE 2

First Tone Menu Select Table

[0] = NO Commands supkgrted yet
[1] = NO Commands supported yet
[2] = NO Commands supported yet
[3] = NO Commands yet
[4] = Transmit Data From Terminal
[5] = NO Commands yet

TABLE 2-continued
First Tone Menu Select Table

[6] = DownLoad Data to Terminal
[7] = Reset/Transmit KWH Parameters Commands
[8] = Terminal Specific Commands
[9] = Utility Commands
[#],[*] Tones are NEVER USED Tone Commands [0]–[3] and [5] (Not yet used)

The Host sends [*] Attention Tone, waits for the Utility Meter Reader of the present invention to send [#] Acknowledge Tone, then Host sends Tone [0], [1], [2], [3] or [5] and 1 more tone, telling the Utility Meter Reader to execute a command. This can be programmed for future use. All Second Tone Values Result in ONLY a [#] Tone Response from the Utility Meter Reader.

Transmit Data Commands [4]

The Host sends [*] Attention Tone, waits for the Utility Meter Reader to send [#] Acknowledge Tone, then Host sends [4] Tone and 1 more tone, telling the Utility Meter Reader of the present invention to:

[0] Tone=Send 12 Digit Serial Number
  The Utility Meter Reader of the present invention sends 12 tones representing the unit Serial #, followed by a [#] Tone, then 2 Tones for the CheckSum. The CheckSum is the decimal addition of the 12 tones. Following the CheckSum, the Utility Meter Reader of the present invention sends the Memory Status Flag(s).

1 Tone =[#]   =Memory OK
  2 Tones=[*][2]=Memory REFRESH (Lost S/N, etc.)

[1] Tone=Send Meter #n KWH Reading
  The Host Sends 1 more Tone [1]/[2], specifying Meter #1/#2. Then, the Utility Meter Reader of the present invention sends 6 Meter Reading #n KWH Number Tones, followed by a [#] Tone, then CheckSum.

[2] Tone=Send Peak Watts & Date/Time for Meter #n
  The Host Sends 1 more Tone [1]/[2], specifying Meter #1/#2. Then, the Utility Meter Reader of the present invention sends 6 Meter #n Peak Watts Tones, followed by 2 Tones Each for the Month, Day, Hour, & Minutes of When the Peak Watt event happened. Lastly, the Terminal sends the [#] Tone & the 2 Tone CheckSum.

[3] Tone=Send # of Meters on Unit
  The Utility Meter Reader of the present invention sends 2 Tones for the # of Meters that it can support, followed by a [#] Tone, then CheckSum.

[4] Tone=Send TEST Auto-Dial Month/Day/Hour
  The Utility Meter Reader of the present invention sends 6 Auto-Dial Time Tones in the format: mmddhh.

mm = Month to Auto-Dial
  dd = Day to Auto-Dial
  hh = Hour to Auto-Dial

The Utility Meter Reader of the present invention calls the Host on the specified month/day/hour. If there is no successful Host connection, the Utility Meter Reader of the present invention will try to call every 255 seconds until successful.

[5] Tone=Send Transaction Code
  The Utility Meter Reader of the present invention sends 2 Tones for the reason for the call followed by 1 [#] and CheckSum:

| Transaction Code | Reason |
| --- | --- |
| 00 | Standard Auto-Dial |
| 01 | TEST Auto-Dial |
| 03 | RS232 Command (Handheld) |
| 04 | Push Button Request |
| 07 | Loop Disconnect |
| 08 | TILT (Tamper) Switch |
| 1n | NO REV Pulse/Hour Fail Safe n=1=Meter 1, n=2=Meter 2 n=3=BOTH Meters |
| 2n | NO KWH Inc/Day Fail Safe n=1=Meter 1, n=2=Meter 2 n=3=BOTH Meters |

[6] Tone=Send Date/Time/Day-of-Week
  The Utility Meter Reader of the present invention sends 6 Date Tones in the format: mmddyy. Then, 6 Time Tones in the format: hhmmss Next, the Utility Meter Reader of the present invention sends 1 Tone=Day-of-Week ([1]=Sunday, [7]=Saturday) Last, the Utility Meter Reader of the present invention sends 1 [#] Tone followed by the CheckSum.

[7] Tone=Send Auto-Dial Month/Day/Hour
  The Utility Meter Reader of the present invention sends 6 Auto-Dial Time Tones in the format: mmddhh.

mm = Month to Auto-Dial
  dd = Day to Auto-Dial
  hh = Hour to Auto-Dial

The Utility Meter Reader of the present invention calls the Host on the specified month/day/hour. If there is no successful Host connection, the Utility Meter Reader of the present invention will try to call every 255 seconds until successful. When the Utility Meter Reader of the present invention wishes to call the Host, the following occurs:
  a) Check If user is on phone line now. If so, do not connect to phone line. Wait another 255 seconds before trying again.
  b) Connect to Phone Line and Check for Dial Tone. If NO Dial Tone, DISCONNECT and wait another 255 seconds.
  c) Dial Host Telephone Number. After dialing, if there is NO Tone response in 25.5 seconds, DISCONNECT and try again in 255 seconds.
  d) Interact with Host and disconnect. If at ANY TIME during b)-d) the User picks up his/her telephone, the Utility Meter Reader of the present invention will IMMEDIATELY DISCONNECT from the phone line, WAIT 1 second, then CONNECT the User to the phone line.

[8] Tone=Send Host Telephone Number
  The Utility Meter Reader of the present invention sends the Telephone Number Tones, followed by a [#] Tone, then CheckSum.

[9] Tone=Send Dialing Speed Parameters
  The Utility Meter Reader of the present invention sends the 19 Dialing Speed Parameter Tones, followed by a [#] Tone, then CheckSum. Each of 5 Dialing Speeds is 3 Tone Digits. The Drop Phone Line Delay is 3 Tone Digits. This delay is in 0.1 second increments. The Pulse/Dial Selection is 1 Tone. The order of parameters is:

```
Pulse Inter-Digit Delay Counter Default=35
Pulse ON-HOOK Delay Counter Default=65
Pulse OFF-HOOK Delay Counter Default=65
Tone Dial Telephone # Delay Counter Default=96
Tone Xmit to Host Delay Counter Default=65
Drop Phone Line Delay (.1 Secs) Default=10
Pulse/Tone Dial Selection Default=0=Tone
[#], [*] Tones are NEVER USED
```

DownLoad Data Commands [b 6]

The Host sends [*] Attention Tone, waits for the Utility Meter Reader of the present invention to send [#] Acknowledge Tone, then Host sends [6] Tone and 1 more tone, telling the Utility Meter Reader of the present invention to:

[0] Tone=Load/Save 12 Digit Serial Number
   The Host Sends an ASCII Tone Sequence (with CheckSum) for the Serial Number. The Utility Meter Reader of the present invention answers with 2 [#] Tones=Good Load or [*][#][0]=ASCII Tone Sequence CheckSum Error. For a CheckSum Error, the Host MUST re-send the data or send 1 [#] Tone=ABORT. Not all 12 digits must be sent. The Utility Meter Reader of the present invention will add leading zeroes to the Serial Number as needed. If the input is longer than 12 digits, the Utility Meter Reader of the present invention truncates the Serial Number at 12 digits.

[1] Tone=Load/Save 6 Digit Meter KWH Reading #n
   The Host Sends 1 more Tone [1]/[2], specifying Meter #1/#2. Then, the Host Sends an ASCII Tone Sequence (with CheckSum) for Meter KWH Reading #n. The Utility Meter Reader of the present invention answers with 2 [#] Tones=Good Load or [*][#][0]=ASCII Tone Sequence CheckSum Error. Not all 6 digits must be sent. The Utility Meter Reader of the present invention will add leading zeroes to Meter KWH Reading #n as needed. If the input is longer than 6 digits, the Utility Meter Reader of the present invention truncates Meter KWH Reading #1 at 6 digits. This Command zeroes the accumulated watts count used for meter number increment.

[2] Tone=Load/Save Output Conditions and #1 Time-of-Day
   The Host sends 2/3 decimal tones representing the Output Conditions. The decimal number is the sum of the appropriate Condition values:

```
1   = Output #1 and Output #2 OFF
2   = Output #2 ON
4   = Output #2 Toggling ON/OFF every 2 Seconds
8   = Output #1 Toggling ON/OFF every Hour
16  = Output #1 ON @Time-of-Day
32  = Output #1 OFF @Time-of-Day
64  = Output #1 ON Immediately
128 = Output #1 OFF Immediately
```

The Host then sends 4 Tones representing the Output #1 Time-of-Day. These Tones are required EVEN if those conditions are NOT set.

[3] Tone=Not used.
4] Tone=Load/Save TEST Auto-Dial Month-/Day/Hour/Min
   The Host sends 2 Tones Each for the TEST Auto-Dial Month, Day, Hour, and Minutes. The Utility Meter Reader of the present invention answers with[#]=OK or [*]=ERROR.
[5] Tone=Not used.
[6] Tone=Load/Save Date/Time/Day-of-Week
   The Host sends 2 Tones Each for:

| Month | e.g. | [0][3]=March |
|---|---|---|
| Day | | [2][1]=21st Day |
| Year | | [9][2]=1992 |
| Hours | | [1][4]=2 PM in 24 Hour format |
| Minutes | | [0][5] | then, 1 Tone=Day-of-Week; [1]=Sunday to [7]=Saturday The Utility Meter Reader of the present invention answers with [#]=OK. If there is an illegal number (say Month=13), then the Utility Meter Reader of the present invention answers with [*]=ERROR.

[7] Tone=Load/Save Auto-Dial Month/Day/Hour/-Min
   The Host sends 2 Tones Each for the Auto-Dial Month, Day, Hour, and Minutes. The Utility Meter Reader of the present invention answers with [#]=OK or [*]=ERROR.

[8] Tone=Load/Save Host Telephone Number
   The Host sends an ASCII Tone Sequence for the Host Telephone Number. The Utility Meter Reader of the present invention answers with 2 [#] Tones=Good Load or [*][#][0]=CheckSum ERROR.

[9] Tone=Load/Save Dialing Speed Parameters
   The Host sends a Decimal Tone Sequence for the Dialing Speed Parameters. The Utility Meter Reader of the present invention answers with 2 [#] Tones=Good Load or [*][#][0]=CheckSum ERROR. The Decimal Tone Sequence contains 2/3 Tones for:

```
Pulse Inter-Digit Delay Counter
Pulse ON-HOOK Delay Counter
Pulse OFF-HOOK Delay Counter
Tone Dial Phone # Delay Counter
Tone Xmit Data Delay Counter
Drop Phone Line Delay (.1 Sec Increments)
Pulse/Tone Selection
```

The Host MUST Send 2 or 3 Tones for the Pulse/-Tone Dial Selection. Tone Dial MUST be a number >=128=[#][2][8], Pulse Dial=1=[0][1].
[#], [*] Tones are NEVER USED Reset/Transmit KWH Parameters Commands [7]

The Host sends [*] Attention Tone, waits for Utility Meter Reader of the present invention to send [#] Acknowledge Tone, then Host sends [5] Tone and 1 more tone, telling Utility Meter Reader of the present invention to:
[0] Tone=Not Used.
[1] Tone=Reset Min Pulse Time/Rolling Avg for Meter #n
   The Host Sends 1 more Tone [1]/[2], specifying Meter #1/#2. Then, the Utility Meter Reader of the present invention Sets the Meter #n Minimum Pulse Time=FFFF Hex and DOES NOT check minimum time again until TWO more Meter #n pulses have occurred. Also, the Terminal zeroes the Rolling Average for Meter #n.

[2] Tone=Send Minimum Pulse Time for Meter #n
The Host Sends 1 more Tone [1]/[2], specifying Meter #1/#2. Then, Utility Meter Reader of the present invention sends 6 Meter #n Minimum Pulse Time Tones, followed by a [#] Tone, then CheckSum. The 6 tones represent two bytes of 3 digits each.

[3] Tone=Send KWH K Factor for Meter #n
The Host Sends 1 more Tone [1]/[2], specifying Meter #1/#2. Then, the Utility Meter Reader of the present invention sends 3 Tones representing the Meter #n KWH K Factor, followed by [#] Tone and CheckSum. The K Factor is expressed in Tenths; e.g. [0][3][6]=3.6 or [0][7][2]=7.2.

[4] Tone=Send KWH Multiplier for Meter #n
The Host Sends 1 more Tone [1]/[2], specifying Meter #1/#2. Then, the Utility Meter Reader of the present invention sends 3 Tones representing the Meter #n KWH Multiplier, followed by [#] Tone and CheckSum. The Multiplier is expressed in Tenths; e.g. [0][0][5]=0.5 or [1][2][0]=12.

[5] Tone=Send Meter #n Rolling Average KWH Reading
The Host Sends 1 more Tone [1]/[2], specifying Meter #1/#2. Then, the Utility Meter Reader of the present invention sends 6 Meter Reading #n Rolling Average KWH Number Tones, followed by a [#] Tone, then CheckSum.

[6] Tone=Load/Save Rolling Average # of Minutes
The Host Sends 1 more Tone [1]/[2], specifying Meter #1/#2, then 2 Tones representing the # of Minutes in that Meter's Rolling Average period.

[7] Tone=Send Rolling Average # of Minutes
The Host Sends 1 more Tone [1]/[2], specifying Meter #1/#2. Then, the Terminal Sends 3 Tones for the # of Minutes in that Meter's Rolling Average Period.

[8] Tone=Load Loop & TILT Disable Flags
The Host sends 2 Tones, 1 each, for Loop and TILT Disable Flags. [0]=Enable Call Check, [1]=Disable Call Check. The Terminal responds with a [#].

[9] Tone=Not Used.

[#],[*] Tones are NEVER USED

Terminal Specific Commands [8]

The Host sends [*] Attention Tone, waits for the Utility Meter Reader of the present invention to send [#] Acknowledge Tone, then Host sends [8] Tone and 1 more tone, telling the Utility Meter Reader of the present invention to:

[0] Tone=Set Auto-Dial for Next Month
The Utility Meter Reader of the present invention increments the Auto-Dial Month and then sends a [#] Tone. If the Month is past December, it rolls to January.

[1] Tone=Send EPROM CheckSum
The Utility Meter Reader of the present invention computes the 3 Byte CheckSum of the EPROM, then sends:
1 Tone=# of Tones to be Sent (not counting this tone)
2/3 Decimal Tones for 3 Byte CheckSum This Command can be used by the Host for EPROM Version Control (maybe different commands).

[2] Tone=DownLoad/Execute RAM Subroutine
The Host can DownLoad and Execute an 8051 assembly language subroutine. This feature is useful for remote testing of the Utility Meter Reader of the present invention. These routines are derived from the Utility Meter Reader System Software and have access to the entire Residential Terminal Data Base. There are specific internal addresses in the Utility Meter Reader of the present invention where these routines can be located; therefore, the Host should NEVER load routines that are NOT correctly linked to the Utility Meter Reader of the present invention. Great care has been taken to ensure the upward compatibility of such routines. The Utility Meter Reader System Software has a parameter file that defines the internal Data Base. Linking a routine with this parameter file ensures that the routine can correctly find any data it wants. The routine also has access to many Utility Meter Reader subroutines through an address table that will never move. Successive Utility Meter Reader versions may add subroutines to the table, but the original ones will always be in the same order. The data format is quite similar to INTEL's standard HEX file format.

The Host first sends the Address where to load the subroutine:
2/3 Decimal Tones=HI Addr Byte
2/3 Decimal Tones=LO Addr Byte
2/3 Tone 2's Complement CheckSum
This command REQUIRES that the subroutine is linked in 1 contiguous memory section. It adds too much time to send the address with each code line. Each code line is appended at the end of the previous code line in RAM.

The Utility Meter Reader of the present invention answers with 1 [#] Tone=OK or [*]=BAD CheckSum. The Terminal expects the Host to re-try 3 times before aborting the command.

Next, each code line is sent:
2/3 Decimal Tones=# Bytes in This Code Line
2/3 Decimal Tones=Byte #1
2/3 Decimal Tones=Last Code Byte
2/3 Decimal 2's Complement CheckSum The Utility Meter Reader of the present invention answers each code line with a [#]=OK or [*]=BAD CheckSum Tone. The Terminal expects the Host to re-try 3 times before aborting the command. When all code lines are loaded, the Host sends 2 [0] Tones (0 Bytes in Code Line). The Utility Meter Reader of the present invention answers with a [#] Tone and executes the Subroutine.

[3] Tone=Load Meter ON/OFF Flags
The Host sends 2 Tones for Meter #1 ON/OFF and Meter #2 ON/OFF. ON=[1] Tone and OFF=[0] Tone. The Terminal responds with [#] Tone. A Meter that gets turned from OFF to ON has its Minimum Pulse Time automatically reset.

[4] Tone=Send Meter ON/OFF Flags
The Utility Meter Reader of the present invention sends 2 Tones representing Meter #1/Meter #2 ON/OFF Status, followed by [#] Tone and CheckSum.

[5] Tone=Load TOU Meter Flags and Switch Times

First, the Host sends 2 Tones for TOU Mode EXT-/ON/OFF and Weekends on Meter #1 ON/OFF. The 1st Tone=[0]=TOU Mode OFF, =[1]=TOU ON w/Time, =[3]=TOU ON with external input. The 2nd Tone=[1]=ON and [0]=OFF. Next, the Host sends 4 Tones each for the Switch to Meter #1 Time-of-Day and the Switch to Meter #2 Time-of-Day. The Utility Meter Reader of the present invention responds with [#]. If BOTH Switch Times=0, the reading ALWAYS goes to Meter #1.

[6] Tone=Send TOU Meter Flags and Switch Times

The Utility Meter Reader of the present invention sends 2 Tones representing the TOU Mode EXT-/ON/OFF Flags and Weekends on Meter #1 ON/OFF Flag. Next, the Terminal sends 4 Tones each for the Switch to Meter #1 Time-of-Day and the Switch to Meter #2 Time-of-Day, followed by a [#] and CheckSum.

[7] Tone=Load/Save Fail Safes and Valid Dates

The Host sends 1 Tone each for the Fail Safe Condition: 1st Tone=NO REV Pulse/Hour=[0-]=OFF=[1]=ON. Then, the Host sends 4 Tones each for the Valid Month/Day Interval for NO KWH Increment. If BOTH Dates=0, this Fail Safe is ALWAYS ON. e.g. [1][1][1][0][0][1][0][4][0][1] for both Fail Safes ON and KWH Test between 10/01 & 04/01.

[8] Tone=Send Fail Safes and Valid Dates

The Utility Meter Reader of the present invention sends 1 Tone for each Fail Safe Condition ON/-OFF, then 4 Tones each for the Valid Month/Day Interval, followed by 1 [#] and CheckSum.

[9] Tone=Not yet Used

The Utility Meter Reader of the present invention Sends ONLY [#].

[#],[*] Tones are NEVER USED

Utility Commands [9]

The Host sends [*] Attention Tone, waits for the Utility Meter Reader of the present invention to send [#] Acknowledge Tone, then Host sends [9] Tone and 1 more tone, telling the Utility Meter Reader of the present invention to execute a command. At the present, tones [0], [1], [2], [3], [4], [5], [6], [7], [8] are not used.

[9] Tone=Disconnect From Phone Line

The Utility Meter Reader of the present invention disconnects from the phone line.

[#], [*] Tones are NEVER USED

The host thus initiates termination of the call by signalling the terminal that all required information has been received. Any earlier interruption of the call (e.g. by the customer placing a telephone off-hook) will be logged by the host as an aborted communication attempt and the call will be completely redone later.

Utility Meter Reader to Host Commands

ALL Utility Meter Reader to Host Commands start with a [*] Tone.

BAD ASCII/Decimal Tone Sequence CheckSum

The Utility Meter Reader of the present invention sends [*][#][0] Tones to indicate a bad Sequence CheckSum.

The Host must either:

1) Send a [#] Tone to ABORT (Terminal answers with [#]) or

2) Re-Send the Sequence (3 times MAX) After the 3rd re-try, the Utility Meter Reader of the present invention will send the [*][#][1] Tones to indicate ABORT.

Utility Meter Reader Serial I/O Commands

All TTL Serial Port I/O Commands to the Terminal are two characters, followed by a Carriage Return. ALL External Commands are CAPITAL LETTERS. In most cases, the second character determines whether the Terminal receives new data for parameter(s) or sends the current parameter(s) for inspection. The <L> character is the second command character to load new data in the Terminal. After data input, the Terminal responds with the Lower Case first Command Letter to show load Command completion. The <X> character is the second command character to have the Terminal send parameter data. The Terminal does not respond with the Lower Case first Command Letter for send data.

| Command | Action |
| --- | --- |
| AX<CR> | Terminal sends the Auto-Dial Month, Day, Hour, and Minute each on a line by itself w/ <CR>: <br> mm<CR> <br> dd<CR> <br> hh<CR> <br> mm<CR> |
| AL<CR> | Terminal then expects 2 digits each for the Auto-Dial Month,Day,Hour w/ <CR>. The Terminal sends a <a> character=function complete or <E>=ERROR. An Auto-Dial Time of all 0s shall NEVER dial. |
| BX<CR> | Terminal sends the Test Auto-Dial Month, Day, Hour, and Minute each on a line by itself w/ <CR>: <br> mm<CR> <br> dd<CR> <br> hh<CR> <br> mm<CR> |
| BL<CR> | Terminal then expects 2 digits each for the Test Auto-Dial Month,Day,Hour w/ <CR>. The Terminal sends a <b> character = function complete or <E>=ERROR. An Auto-Dial Time of all 0s shall NEVER dial. |
| C?<CR> | 2nd character=any character Connect to phone line. After receipt of Tone from Host, Terminal sends a <c> character=Terminal connected. |
| D?<CR> | 2nd character=any character Disconnect from phone line. After User Dial Tone Delay (about 1 Sec), Terminal sends a <d> character=Terminal disconnected. The Terminal ALWAYS sends the <c>/<d> characters when auto-dialing as well. |
| EX<CR> | Terminal sends 2 Digits+<CR>. 1st digit=Meter #1 ON/OFF; 2nd digit=Meter #2 ON/OFF. A <0>=OFF and a <1>=ON. |
| EL<CR> | Terminal expects the 2 Meter ON/OFF (<1>/<0>) digits w/ <CRS. Then, Terminal sends an <e>. |
| FX<CR> | Terminal sends 2 digits+<CR> for Fail Save Conditions: <br> 1st Digit=NO REV Pulse/Hour, <0>=OFF, <1>=ON <br> 2nd Digit=NO KWH Increment/Day, <br> The Terminal then sends 4 digits for the Month/Day Windows for KWH Increment test. The Fail Safe is ACTIVE from the 1st Date up to, but not including the 2nd Date. |
| FL<CR> | Terminal expects 2 digits+<CR> for Fail Safe Conditions shown under FX Command. Then, Terminal expects 4 digits for Month/Day Windows for KWH Increment test. The Fail Safe is ACTIVE from the 1st Date up to, but not including the 2nd Date. If BOTH |

-continued

| Command | Action |
|---|---|
| | Dates=0, this Fail Safe is ALWAYS ON. Then, Terminal sends an <f>. |
| G<n><CR> | Terminal sends the Rolling Average Watts for Meter #n as 6 digits+<CR>. |
| HX<CR> | Next, Terminal expects a 1<CR> or 2<CR> to specify which meter. Then, Terminal sends 3 Digit Meter #n Rolling Average Period in Minutes. |
| HL<CR> | Next, Terminal expects a 1<CR> or 2<CR> to specify which meter. Then, Terminal expects the Rolling Average # of minutes for Meter #n +<CR>. Then, Terminal sends an <h>. |
| I?<CR> | 2nd character=any character Initializes EEPROM, then sends <i>. |
| J?<CR> | Terminal sends 2 digits+<CR> for current state of Loop & TILT Inputs. Normal is Loop=<O>=LOW and TILT=<1>=HI. |
| KX<CR> | Next, Terminal expects a 1<CR> or 2<CR> to specify which-meter. Then, Terminal sends 3 Digit Meter #n KWH K Factor+<CR>. K Factor (in Tenths)=036 or 072 for 3.6 or 7.2. |
| KL<CR> | Next, Terminal expects a 1<CR> or 2<CR> to specify which meter. Then, Terminal Expects the Meter KWH K Factor w/ <CR>. The data can be 1 to 3 digits. The Terminal then responds with a <k>. Remember: K Factor is in Tenths. |
| LX<CR> | Terminal sends 2 digits to represent the NO Check User PickUp during Connect/Pulse Dial Flag. ONLY the 2nd digit=Flag. The 1st digit is always <0>. |
| LL<CR> | Next, Terminal expects a 1<CR> or 0<CR> to Set/Clear the NO Check User PickUp during Connect/Pulse Dial. This is ONLY used if the User Equipment draws too much current AND has to Pulse Dial. |
| MX<CR> | Next, Terminal expects a 1<CR> or 2<CR> to specify which meter. Then, Terminal sends the Meter KWH Reading as 6 digits+<CR>. |
| ML<CR> | Next, Terminal expects a 1<CR> or 2<CR> to specify which meter. Then, Terminal Expects the Meter KWH Reading w/ <CR>. The number of digits entered may be < 6. The Terminal adds any necessary leading zeroes. The Terminal sends a <m> character=function complete. If there is a digit error, say <A> instead of <2>, the Terminal sends <E> character=ERROR. |
| NX<CR> | Terminal sends the unit Serial Number+<CR>. |
| NL<CR> | Terminal then expects the Serial Number digits followed by a <CR>. The number of digits entered may be < 12. The Terminal adds any necessary leading zeroes. The Terminal sends a <n> character=function complete or <E>=ERROR. |
| OX<CR> | Terminal sends the decimal number+<CR> for the eight Output Conditions. The number represents the addition of each parameter value:<br>1 = Outputs #1 & #2 OFF<br>2 = Output #2 ON<br>4 = Output #2 Toggles ON/OFF every 2 Secs<br>8 = Output #1 Toggles ON/OFF every Hour<br>16 = Output #1 ON @Time-of-Day<br>32 = Output #1 OFF@Time-of-Day<br>64 = Output #1 ON Immediately<br>128 = Output #1 OFF Immediatley<br>The Terminal then sends 4 digits for the Time-of-Day+<CR>. |
| OL<CR> | The Terminal expects a 2/3 digit decimal number+<CR> for the Output Conditions. Then, 4 digits for the Output #1 ON/OFF Time-of-Day. This input IS REQUIRED even if that option is NOT selected. Then, Terminal sends an <o>. |
| PX<CR> | Terminal sends the phone number+<CR>. |
| PL<CR> | Terminal then expects the Phone number digits followed by a <CR>. The Terminal sends a <p> character=function complete or |

-continued

| Command | Action |
|---|---|
| | <E>=ERROR. |
| R<n><CR> | Resets the Minimum Pulse Time to FFFFH and Rolling Average to 0 for Meter n. The Terminal sends a <r> character=function complete or <E>=ERROR. |
| SX<CR> | Terminal sends 3 digits+<CR> for each of the following parameters:<br>Pulse Inter-Digit Delay Count<br>Pulse ON-HOOK Delay Count<br>Pulse OFF-HOOK Delay Count<br>Tone Dial Phone # Delay Count<br>Tone Data Transmit Delay Count<br>User OFF-HOOK-Drop Line Time (.1 Secs)<br>Then 1 digit for Pulse/Tone Dial Selection, digit=0=Tone Dial, digit=1=Pulse Dial. |
| SL<CR> | Next, Terminal expects the same parameters as shown in the SX Command, all on 1 line, separated by commas and followed by a <CR>.<br>e.g. 35,65,65,96,65,10,0<CR><br>The Terminal sends a <a> character = function complete or <E>=ERROR. |
| TX<CR> | Terminal sends: Date,Time,Day-of-Week<br>mm/dd/yy<CR>  e.g. 02/20/92<CR><br>hh:mm:ss<CR>            15:33:22<CR><br>ddd<CR>                THU<CR> |
| TL<CR> | Terminal then expects 3 inputs for Date,Time, and Day-of-Week. The Date and Time are in the format shown for TX Command. The Day-of-Week is 1 digit+<CR> w/ the digit=1=Sunday to digit=7=Saturday. The Terminal sends a <t> character=function complete or <E>=ERROR. |
| UX<CR> | Terminal sends 2 ON/OFF digits+<CR>. 1st ON/OFF Digit=TOU Meter Mode ON/OFF; 2nd ON/OFF digit=Sat/Sun on M1 ON/OFF. ON=<1> and OFF=<0>. Next, Terminal sends the Switch to M1 Time and the Switch to M2 Time:<br>hh<CR>    Switch to M1 Hours,Mins<br>mm<CR><br>hh<CR>    Switch to M2 Hours,Mins<br>mm<CR> |
| UL<CR> | Terminal expects 2 ON/OFF digits+<CR> for TOU Mode ON/OFF and Sat/Sun on M1 ON/OFF. Then, 8 digits+<CR> for the Switch to M1 and Switch to M2 times:<br><h1><h1><m1><m1><h2><h2><m2><m2><CR><br>Terminal then-responds w/ <u>.<br>If BOTH Times=0, the reading ALWAYS goes to Meter #1. |
| VX<CR> | Terminal sends "Pn" for each Meter Pulse |
| V<c><CR> | For any character <c> that is NOT <X>, Stops Terminal sending "Pn" for each Meter Pulse. |
| W<n><CR> | Sends 6 Digit Meter #n Peak Watts+<CR>, Date+<CR>, Time+<CR>. The Date/Time is when the Peak Watts occurred. |
| XX<CR> | Next, Terminal expects a 1<CR> or 2<CR> to specify which meter. Then, Terminal sends 3 Digit Meter #n KWH Multiplier Factor+<CR>. Multiplier (in Tenths)= 005 or 120 for 0.5 or 12.0. |
| XL<CR> | Next, Terminal expects a 1<CR> or 2<CR> to specify which meter. Then, Terminal Expects the Meter KWH Multiplier wl <CR>. The data can be 1 to 3 digits. The Terminal then responds with a <x>. Remember: K Factor is in Tenths. |
| YX<CR> | Terminal sends 2 digits+<CR> for Loop & TILT Disable. <O>=Ck ON, <1>=Ck Disabled. |
| YL<CR> | Terminal expects 2 digits+<CR> for Loop & TILT Disable. <O>=Ck ON, <1>=Ck Disabled |
| Z?<CR> | Terminal sends 2 digits+<CR> for the maximum # of Meters on this unit. |

Host Interface Serial I/O Commands

All Serial Port I/O Commands to the Host Interface are one character followed by a Carriage Return.

| Command | Action |
| --- | --- |
| C<CR> | Interface connects to phone line, sends <c>=on phone line. |
| D<CR> | Interface disconnects from phone line, sends <d>=off phone-line. |
| N<CR> | Interface expects # of Rings for Auto-Answer followed by <CR>. The # of Rings can be 0 to 255. Interface then sends <n>=function complete or <E>=ERROR. |
| R<CR> | Interface sends 3 digits for the # of Rings for Auto-Answer+<CR>. |
| S<CR> | Interface expects 2 lines of input for Phone number Tone Delay count and Tone Data Xmit Delay count. Each line must have a <CR>. Each count can be 0 to 255. Interface then sends <s>=function complete or <E>=ERROR. |
| T<CR> | Interface sends 3 digits+<CR>for each of the parameters described in S Command. |
| M<CR> | Interface expects 1 line of input for ON-Phone Line TimeOut in Tenths of Seconds. The TimeOut can be 0 to 255. Interface then sends <m>=function complete or <E>=ERROR. |
| O<CR> | Interface sends 3 digits+<CR>for ON-Phone Line Timeout (Tenths of Seconds). |

While the present invention has been described in connection with the preferred embodiment thereof, it will be understood that many modifications will be readily apparent to those of ordinary skill in the art. For example, the present invention is adaptable to monitoring and reporting utility usage for water, electric, gas and other utilities. This application is intended to cover any adaptations or variations thereof. Therefore, it is manifestly intended that this invention be limited only by the claims and the equivalence thereof.

What is claimed is:

1. A utility meter usage reporting apparatus for reliable communication over a standard telephone line to record utility usage at a host site, comprising:
   control means including a microprocessor and memory;
   means connected to said control means for receiving signals indicative of utility usage to be reported;
   communication means connected to said control means for initiating a telephone connection over the telephone line at a predetermined time and date directly to said host site and for bidirectional communication of control information and utility usage data thereover using handshaking protocol which does not allow recording of a communication transaction with the host site until both the host site and said control means verify an uninterrupted and accurate receipt of said control information and said utility usage data;
   said control information and said utility usage data being encoded using DTMF tones into data packets; and
   said data packets being constructed to include checksum calculations to ensure accuracy in the receipt of said data packets.

2. The utility meter usage reporting apparatus according to claim 1 wherein said communications means further includes DTMF-to-ASCII tone conversion including data compression modes.

3. The utility meter usage reporting apparatus according to claim 2 wherein said data compression modes further allows rapid transmission of numeric data by using an ASCII character to shift tone translation from ASCII conversion to direct tone conversion.

4. The utility meter usage reporting apparatus according to claim 1 wherein said communication means further includes off-hook detect means for sensing an off-hook condition of the telephone line and for causing the communication means to relinquish the telephone line in response thereto.

5. A utility meter usage reporting apparatus for use with a customer's telephone line having customer's telephone equipment connected thereto, comprising:
   control means including a microprocessor and memory;
   means connected to said control means for receiving signals indicative of utility usage to be reported;
   communication means connected to said control means and connected between the customer's telephone line and the customer's telephone equipment for initiating a telephone connection over the customer's telephone line at a predetermined time and date directly to a host and for bidirectional communication of control information and utility usage data using DTMF tones to encode the control information and utility usage information in data packets with checksum; and
   off-hook detect means connected to said communication means for sensing an off-hook condition of the customer's telephone equipment and for causing the communication means to relinquish the customer's telephone line in response thereto such that the host does not record the utility usage information in response to an interrupted transmission.

6. A method of communicating utility usage information from a consumer location to a host, comprising the steps of:
   recording utility usage information at the consumer location;
   calling a host from the consumer location over a standard telephone line;
   waiting for the host to acknowledge the connection;
   acknowledging the host connection;
   receiving the host request for information;
   transmitting the utility usage information using DTMF tones;
   waiting for the host to acknowledge the receipt;
   sensing an off-hook condition of telephone equipment also attached to the telephone line at any time during the above steps;
   immediately dropping the telephone line if an off-hook condition is sensed;
   recording the call as incomplete; and
   calling the host at a later time to complete the communication.

* * * * *

UNITED STATES PATENT AND TRADEMARK OFFICE
CERTIFICATE OF CORRECTION

PATENT NO. : 5,381,462
DATED : January 10, 1995
INVENTOR(S) : Rodney L. Larson et al.

It is certified that error appears in the above-indentified patent and that said Letters Patent is hereby corrected as shown below:

In Column 4, line 19, please delete -- an immediately dial tone-- and insert "a dial tone immeidately"

In Column 4, line 68, please delete --view-- and insert "viewed"

In Column 6, line 12, please delete --in not lost-- and insert "is not lost"

In Column 10, line 40, please delete --This ca-- and insert "This can"

In Column 14, lines 24 & 25 please delete --GOOD CHSUM-- and insert "GOOD CHKSUM" and delete --BAD CHSUM-- and insert "BAD CHKSUM"

In Column 21, line 10, please delete --[9][#], [9][#]-- and insert [9][#], [9][*]"

In Column 21, line 44, please delete --as 1 and [#]-- and insert "as 1 and [*]"

In Column 22, line 64, please delete --supkrgrted-- and insert "supported"

In Column 25, line 16, please delete --[b 6]-- and insert "[6]

In Column 30, lines 44-45, please delete --receipt of Tone-- and insert "receipt of [#] Tone"

In Column 30, line 56, please delete --<CRS-- and insert "<CR"

In Column 30, line 60, please insert after Day, "<0>=OFF, <1>=ON"

UNITED STATES PATENT AND TRADEMARK OFFICE
CERTIFICATE OF CORRECTION

PATENT NO. : 5,381,462
DATED : January 10, 1995
INVENTOR(S) : Rodney L. Larson et al.

It is certified that error appears in the above-indentified patent and that said Letters Patent is hereby corrected as shown below:

In Column 32, line 58, please delete --w1-- and insert "W/"

Signed and Sealed this

Fifth Day of August, 1997

Attest:

BRUCE LEHMAN

Attesting Officer

Commissioner of Patents and Trademarks